United States Patent
Khan

(10) Patent No.: US 9,495,154 B2
(45) Date of Patent: Nov. 15, 2016

(54) VECTOR PROCESSING ENGINES HAVING PROGRAMMABLE DATA PATH CONFIGURATIONS FOR PROVIDING MULTI-MODE VECTOR PROCESSING, AND RELATED VECTOR PROCESSORS, SYSTEMS, AND METHODS

(71) Applicant: QUALCOMM Incorporated, San Diego, CA (US)

(72) Inventor: Raheel Khan, Tustin, CA (US)

(73) Assignee: QUALCOMM Incorporated, San Diego, CA (US)

( * ) Notice: Subject to any disclaimer, the term of this patent is extended or adjusted under 35 U.S.C. 154(b) by 658 days.

(21) Appl. No.: 13/798,641

(22) Filed: Mar. 13, 2013

(65) Prior Publication Data
US 2014/0281370 A1 Sep. 18, 2014

(51) Int. Cl.
*G06F 9/02* (2006.01)
*G06F 9/30* (2006.01)
*G06F 15/78* (2006.01)
*G06F 15/80* (2006.01)
*G06F 9/38* (2006.01)

(52) U.S. Cl.
CPC ........ *G06F 9/30036* (2013.01); *G06F 9/3887* (2013.01); *G06F 9/3897* (2013.01); *G06F 15/7867* (2013.01); *G06F 15/8053* (2013.01)

(58) Field of Classification Search
CPC .................................................... G06F 19/20
See application file for complete search history.

(56) References Cited

U.S. PATENT DOCUMENTS 5,778,241 A 7/1998 Bindloss et al.
5,805,875 A 9/1998 Asanovic
(Continued)

FOREIGN PATENT DOCUMENTS

| WO | 9945462 A1 | 9/1999 |
| WO | 2012149871 A1 | 11/2012 |
| WO | 2014164931 | 10/2014 |

OTHER PUBLICATIONS

Palkovic, et al., "Time-Space Energy Consumption Modeling of Dynamic Reconfigurable Coarse-Grain Array Processor Datapath for Wireless Applications", IEEE Workshop on Signal Processing Systems, SiPS, 2010, pp. 134-139.
(Continued)

*Primary Examiner* — Cheng-Yuan Tseng
(74) *Attorney, Agent, or Firm* — Loza & Loza LLP

(57) ABSTRACT

Embodiments disclosed herein include vector processing engines (VPEs) having programmable data path configurations for providing multi-mode vector processing. Related vector processors, systems, and methods are also disclosed. The VPEs include a vector processing stage(s) configured to process vector data according to a vector instruction executed in the vector processing stage. Each vector processing stage includes vector processing blocks each configured to process vector data based on the vector instruction being executed. The vector processing blocks are capable of providing different vector operations for different types of vector instructions based on data path configurations. Data paths of the vector processing blocks are programmable to be reprogrammable to process vector data differently according to the particular vector instruction being executed. In this manner, a VPE can be provided with its data paths configuration programmable to execute different types of functions based on data path configuration according to the vector instruction being executed.

28 Claims, 13 Drawing Sheets

(56) References Cited

U.S. PATENT DOCUMENTS

| | | | |
|---|---|---|---|
| 6,006,245 | A | 12/1999 | Thayer |
| 7,159,099 | B2 | 1/2007 | Lucas et al. |
| 7,272,751 | B2 | 9/2007 | Beacom et al. |
| 7,299,342 | B2 | 11/2007 | Nilsson et al. |
| 7,519,646 | B2 | 4/2009 | Kaul et al. |
| 8,051,123 | B1 | 11/2011 | Oberman et al. |
| 8,156,284 | B2 | 4/2012 | Vorbach et al. |
| 8,320,478 | B2 | 11/2012 | Singh et al. |
| 8,341,204 | B2 | 12/2012 | Arakawa et al. |
| 2003/0009502 | A1 | 1/2003 | Katayanagi |
| 2003/0105949 | A1 | 6/2003 | Master et al. |
| 2004/0193837 | A1 | 9/2004 | Devaney et al. |
| 2005/0165878 | A1 | 7/2005 | Kwon |
| 2007/0106718 | A1 | 5/2007 | Shum et al. |
| 2007/0185953 | A1* | 8/2007 | Prokopenko ............ G06F 7/483 708/523 |
| 2008/0243976 | A1 | 10/2008 | Wiencke |
| 2011/0072236 | A1 | 3/2011 | Mimar |
| 2013/0031154 | A1 | 1/2013 | Wiencke et al. |
| 2013/0339649 | A1* | 12/2013 | Hsu ........................ G06F 3/14 711/170 |
| 2014/0280407 | A1 | 9/2014 | Khan |
| 2014/0280420 | A1 | 9/2014 | Khan |
| 2015/0143076 | A1 | 5/2015 | Khan |
| 2015/0143077 | A1 | 5/2015 | Khan |
| 2015/0143078 | A1 | 5/2015 | Khan |
| 2015/0143079 | A1 | 5/2015 | Khan |
| 2015/0143085 | A1 | 5/2015 | Khan |
| 2015/0143086 | A1 | 5/2015 | Khan |

OTHER PUBLICATIONS

Derby J.H., et al., "A high-performance embedded DSP core with novel SIMD features", Proceedings of International Conference on Acoustics, Speech and Signal Processing (ICASSP'03) Apr. 6-10, 2003 Hong Kong, China; [IEEE International Conference on Acoustics, Speech, and Signal Processing (ICASSP)], IEEE, 2003 IEEE International Confe, vol. 2, Apr. 6, 2003 (Apr. 6, 2003), pp. 301-304, XP010640941, DOI: 10.1109/ICASSP.2003.1202354 ISBN: 978-0-7803-7663-2 sections III and V, figure 3.

Schoenes M., et al., "A novel SIMD DSP architecture for software defined radio", Midwest Symposium on Circuits and Systems, Cairo, Egypt, Dec. 27-30, 2003; [Midwest Symposium on Circuits and Systems], Piscataway, NJ, IEEE, US, vol. 3, Dec. 27, 2003 (Dec. 27, 2003), p. 1443, XP010866282, DOI: 10.1109/MWSCAS. 2003.1562567 ISBN: 978-0-7803-8294-7 section II; figures 2, 3.

Sun, et al., "Multiple-Precision Subword-Parallel Multiplier using Correction-Value Merging Technique", ASICON International Conference, 2007, pp. 48-51.

Athanas P., et al., "An Overview of Configurable Computing Machines for Software Radio Handsets", IEEE Communications Magazine, IEEE Service Center, Piscataway, US, vol. 41 (7), Jul. 1, 2003, pp. 134-141.

Ciricescu S., et al., "The Reconfigurable Streaming Vector Processor (RSVP)", Microarchitecture, 2003, Proceedings, 36th Annual IEEE/ACM International Symposium on Dec. 3-5, 2003, Piscataway, NJ, USA, IEEE, pp. 141-150.

International Search Report and Written Opinion—PCT/US2014/ 022162—ISA/EPO—Jul. 3, 2014.

Parhami B., et al., "Computer Arithmetic, Algorithms and Hardware Designs" In: "Computer Arithmetic, Algorithms and Hardware Designs", 2000, Oxford University Press, New York, XP055132227, ISBN: 978-0-19-512583-2 pages 128-133, 203, 204, 468-469, section 12.6, 4th paragraph, 3rd sentence, figure 12.19(b) p. 468, paragraph 6; figure 28.2.

* cited by examiner

VECTOR PROCESSING ENGINES HAVING PROGRAMMABLE DATA PATH CONFIGURATIONS FOR PROVIDING MULTI-MODE VECTOR PROCESSING, AND RELATED VECTOR PROCESSORS, SYSTEMS, AND METHODS

RELATED APPLICATIONS

The present application is related to U.S. patent application Ser. No. 13/798,599 entitled "Vector Processing Engines Having Programmable Data Path Configurations For Providing Multi-Mode Radix-$2^X$ Butterfly Vector Processing Circuits, And Related Vector Processors, Systems, And Methods," filed on Mar. 13, 2013 and incorporated herein by reference in its entirety.

The present application is also related to U.S. patent application Ser. No. 13/798,618 entitled "Vector Processing Carry-Save Accumulators Employing Redundant Carry-Save Format To Reduce Carry Propagation, And Related Vector Processors, Systems, And Methods," filed on Mar. 13, 2013 and incorporated herein by reference in its entirety.

BACKGROUND

I. Field of the Disclosure

The field of the disclosure relates to vector processors and related systems for processing vector and scalar operations, including single instruction, multiple data (SIMD) processors and multiple instruction, multiple data (MIMD) processors.

II. Background

Wireless computing systems are fast becoming one of the most prevalent technologies in the digital information arena. Advances in technology have resulted in smaller and more powerful wireless communications devices. For example, wireless computing devices commonly include portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless communications devices include other types of devices. For example, a wireless telephone may include a digital still camera, a digital video camera, a digital recorder, and/or an audio file player. Also, wireless telephones can include a web interface that can be used to access the Internet. Further, wireless communications devices may include complex processing resources for processing high speed wireless communications data according to designed wireless communications technology standards (e.g., code division multiple access (CDMA), wideband CDMA (WCDMA), and long term evolution (LTE)). As such, these wireless communications devices include significant computing capabilities.

As wireless computing devices become smaller and more powerful, they become increasingly resource constrained. For example, screen size, amount of available memory and file system space, and amount of input and output capabilities may be limited by the small size of the device. Further, battery size, amount of power provided by the battery, and life of the battery are also limited. One way to increase the battery life of the device is to design processors that consume less power.

In this regard, baseband processors may be employed for wireless communications devices that include vector processors. Vector processors have a vector architecture that provides high-level operations that work on vectors, i.e. arrays of data. Vector processing involves fetching a vector instruction once and then executing the vector instruction multiple times across an entire array of data elements, as opposed to executing the vector instruction on one set of data and then re-fetching and decoding the vector instruction for subsequent elements within the vector. This process allows the energy required to execute a program to be reduced, because among other factors, each vector instruction needs to be fetched fewer times. Since vector instructions operate on long vectors over multiple clock cycles at the same time, a high degree of parallelism is achievable with simple in-order vector instruction dispatch.

FIG. 1 illustrates an exemplary baseband processor 10 that may be employed in a computing device, such as a wireless computer device. The baseband processor 10 includes multiple processing engines (PEs) 12 each dedicated to providing function-specific vector processing for specific applications. In this example, six (6) separate PEs 12(0)-12(5) are provided in the baseband processor 10. The PEs 12(0)-12(5) are each configured to provide vector processing for fixed X-bit wide vector data 14 provided from a shared memory 16 to the PEs 12(0)-12(5). For example, the vector data 14 could be 512 bits wide. The vector data 14 can be defined in smaller multiples of X-bit width vector data sample sets 18(0)-18(Y) (e.g., 16-bit and 32-bit sample sets). In this manner, the PEs 12(0)-12(5) are capable of providing vector processing on multiple vector data sample sets provided in parallel to the PEs 12(0)-12(5) to achieve a high degree of parallelism. Each PE 12(0)-12(5) may include a vector register file (VR) for storing the results of a vector instruction processed on the vector data 14.

Each PE 12(0)-12(5) in the baseband processor 10 in FIG. 1 includes specific, dedicated circuitry and hardware specifically designed to efficiently perform specific types of fixed operations. For example, the baseband processor 10 in FIG. 1 includes separate Wideband Code Division Multiple Access (WCDMA) PEs 12(0), 12(1) and Long Term Evolution (LTE) PEs 12(4), 12(5), because WCDMA and LTE involve different types of specialized operations. Thus, by providing separate WCDMA-specific PEs 12(0), 12(1) and LTE-specific PEs 12(4), 12(5), each of the PEs 12(0), 12(1), 12(4), 12(5) can be designed to include specialized, dedicated circuitry that is specific to frequently performed functions for WCDMA and LTE for highly efficient operation. This design is in contrast to scalar processing engines that include more general circuitry and hardware designed to be flexible to support a larger number of unrelated operations, but in a less efficient manner.

Providing function-specific PEs in a baseband processor is advantageous for frequently executed, specialized operations. However, providing function-specific PEs can increase area and power needed for the baseband processor, because the separate function-specific PEs each include specialized circuitry and memories.

SUMMARY OF THE DISCLOSURE

Embodiments disclosed herein include vector processing engines (VPEs) having programmable data path configurations for providing multi-mode vector processing. Related vector processors, systems, and methods are also disclosed. The VPEs disclosed herein include at least one vector processing stage configured to process vector data according to a vector instruction being executed by a vector processing stage. Each vector processing stage includes one or more vector processing blocks configured to process vector data based on the vector instruction being executed. Non-limiting examples of vector processing blocks are multipliers and accumulators. The vector processing blocks are capable of providing different functions for different types of instructions in different modes based on a programmable data path configuration of the vector processing blocks. In this manner, a VPE can be provided with its data path configurations reprogrammable to execute different types of functions according to the vector instruction being executed.

As a result, fewer VPEs can provide desired technology specific, thus saving area in the baseband processor while still retaining vector processing advantages of fewer register writes and faster instruction execution compared to scalar processing engines. The data path configurations for the vector processing blocks may also be programmed and reprogrammed during vector instruction execution in the VPE to support execution of different, specialized vector operations in different modes in the VPE.

The VPEs having programmable data path configurations for multi-mode vector processing disclosed herein are distinguishable from VPEs that only include fixed data path configurations to provide fixed functions. The VPEs having programmable data path configurations for vector processing disclosed herein are also distinguishable from scalar processing engines, such as those provided in digital signal processors (DSPs) for example. Scalar processing engines employ flexible, common circuitry and logic to perform different types of non-fixed functions, but also write intermediate results during vector instruction execution to register files, thereby consuming additional power and increasing vector instruction execution times.

In this regard in one embodiment, a VPE is provided. The VPE is configured to provide multi-mode vector processing of vector data. The VPE comprises an input read stage configured to provide a plurality of vector data input sample sets of a width of a vector array in an input data path among a plurality of input data paths. The VPE also comprises at least one vector processing stage comprising a plurality of vector processing blocks. Each vector processing block among the plurality of vector processing blocks is configured to receive at least one vector data input sample set from the plurality of vector data input sample sets from at least one input data path among the plurality of input data paths. Each vector processing block among the plurality of vector processing blocks is further configured to process the at least one vector data input sample set to provide at least one vector result output sample set based on a programmable data path configuration for each vector processing block according to a vector instruction executed by the at least one vector processing stage. Each vector processing block among the plurality of vector processing blocks is further configured to provide the at least one vector result output sample set in at least one output data path among a plurality of output data paths. The VPE also comprises an output processing stage configured to receive the at least one vector result output sample set from each of the plurality of vector processing blocks.

In another embodiment, a VPE configured to provide multi-mode vector processing of vector data is provided. The VPE comprises an input read stage means configured to provide a plurality of vector data input sample sets of a width of a vector array in an input data path among a plurality of input data paths. The VPE also comprises at least one vector processing stage means. The at least one vector processing stage means comprises a plurality of vector processing means. Each vector processing means among the plurality of vector processing means is configured to receive at least one vector data input sample set from the plurality of vector data input sample sets from at least one input data path among the plurality of input data paths. Each vector processing means among the plurality of vector processing means is further configured to process the at least one vector data input sample set to provide at least one vector result output sample set based on a programmable data path configuration for each vector processing block according to a vector instruction executed by the at least one vector processing stage. Each vector processing means among the plurality of vector processing means is further configured to provide the at least one vector result output sample set in at least one output data path among a plurality of output data paths. The VPE also comprises an output processing means configured to receive the at least one vector result output sample set from each of the plurality of vector processing means.

In another embodiment, a method of processing vector data in a vector processing engine (VPE) is provided. The method comprises providing a plurality of vector data input sample sets of a width of a vector array in an input data path among a plurality of input data paths in an input processing stage. The method also comprises processing the plurality of vector data input sample sets in a plurality of vector processing blocks in at least one vector processing stage. The method also comprises in each of the plurality of vector processing blocks, receiving at least one vector data input sample set from the plurality of vector data input sample sets from at least one input data path among the plurality of input data paths, processing the at least one vector data input sample set to provide at least one vector result output sample set based on a programmable data path configuration for each vector processing block according to a vector instruction executed by the at least one vector processing stage. The method further comprises providing the at least one vector result output sample set in at least one output data path among a plurality of output data paths. The method also comprises receiving the at least one vector result output sample set from each of the plurality of vector processing blocks in an output processing stage.

In another embodiment, a vector processor is provided. The vector processor comprises at least one vector register configured to receive a vector data input sample set from a vector data memory. The vector processor also comprises at least one vector result register configured to store a vector result output sample set. The vector processor also comprises at least one VPE comprising a plurality of vector processing stages. The plurality of vector processing stages are each configured to receive at least one vector data input sample set from the at least one vector register, process the at least one vector data input sample set from the at least one vector register into at least one vector result output sample set based on at least one data path configuration for each of the vector processing stages according to a vector instruction executed by each vector processing stage, and provide the at least one vector result output sample set to the at least one vector register to be stored in the at least one vector result register.

DETAILED DESCRIPTION

Figure 1:
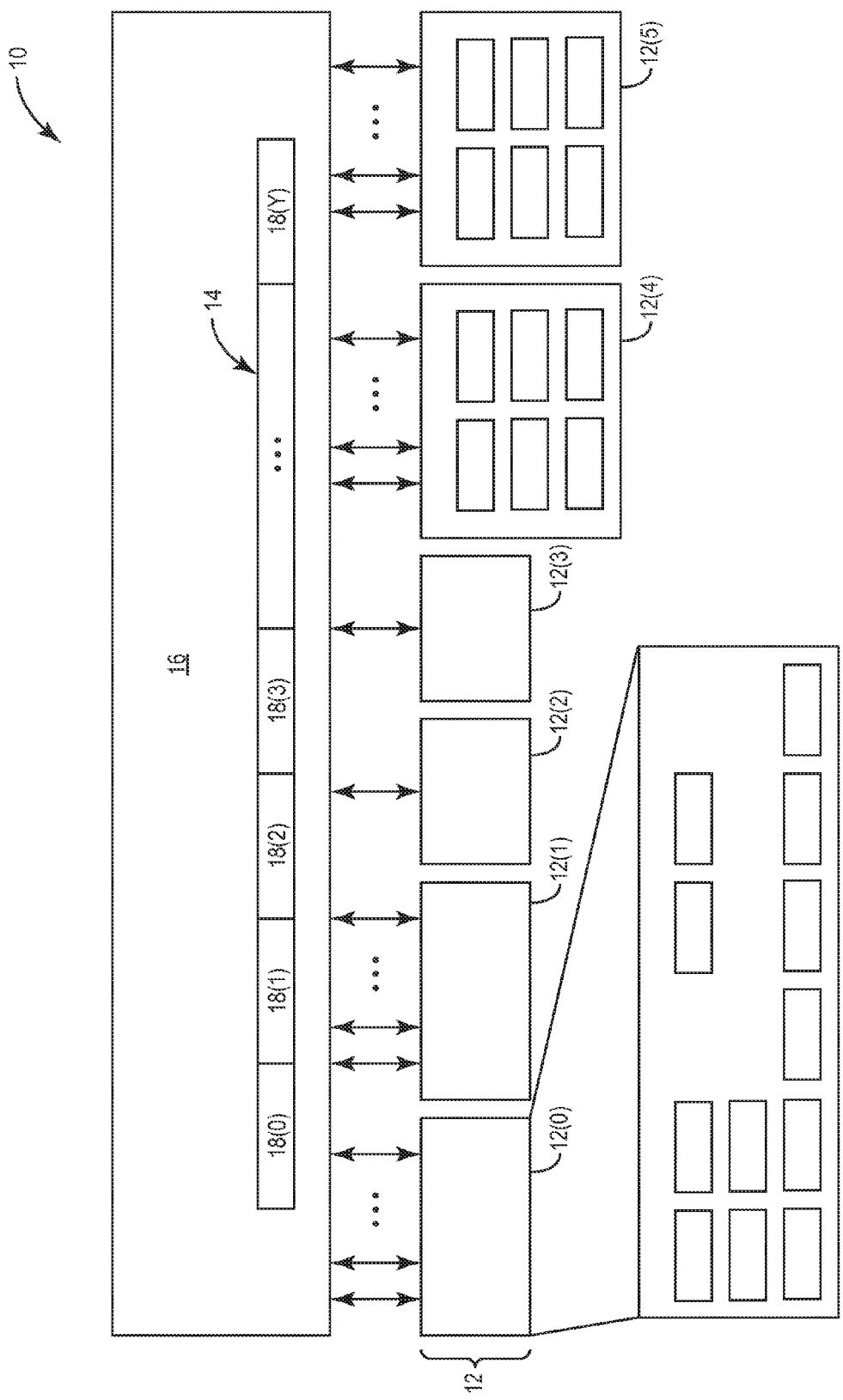
FIG. 1 is a schematic diagram of an exemplary vector processor that includes multiple vector processing engines (VPEs) each dedicated to providing function-specific vector processing for specific applications.

With reference now to the drawing figures, several exemplary embodiments of the present disclosure are described.

The word "exemplary" is used herein to mean "serving as an example, instance, or illustration." Any embodiment described herein as "exemplary" is not necessarily to be construed as preferred or advantageous over other embodiments.

Embodiments disclosed herein include vector processing engines (VPEs) having programmable data path configurations for providing multi-mode vector processing. Related vector processors, systems, and methods are also disclosed. The VPEs disclosed herein include at least one vector processing stage configured to process vector data according to a vector instruction being executed by a vector processing stage. Each vector processing stage includes one or more vector processing blocks configured to process vector data based on the vector instruction being executed. Non-limiting examples of vector processing blocks are multipliers and accumulators. The vector processing blocks are capable of providing different vector operations for different types of instructions in different modes based on a data path configuration of the vector processing blocks. The data path configurations of the vector processing blocks are programmable and can be reprogrammable (i.e., rewired) to process vector data differently to provide specialized vector processing operations in different modes according to the particular vector instruction being executed.

In this manner, a VPE can be provided with its data paths configurations reprogrammable to execute different types of vector operations according to the vector instruction being executed. As a result, fewer VPEs can provide desired vector processing operations in a vector processor, thus saving area in the vector processor while still retaining vector processing advantages of fewer register writes and faster vector instruction execution times over scalar processing engines. The data path configurations for the vector processing blocks may also be programmed and reprogrammed during vector instruction execution in the VPE to support execution of different, specialized vector operations in different modes in the VPE.

The VPEs having programmable data path configurations for multi-mode vector processing disclosed herein are distinguishable from VPEs that only include fixed data path configurations to provide fixed functions. The VPEs having programmable data path configurations for vector processing disclosed herein are also distinguishable from scalar processing engines, such as those provided in digital signal processors (DSPs) for example. Scalar processing engines employ flexible, common circuitry and logic to perform different types of non-fixed functions, but also write intermediate results during vector instruction execution to register files, thereby consuming additional power and increasing vector instruction execution times.

Figure 2:
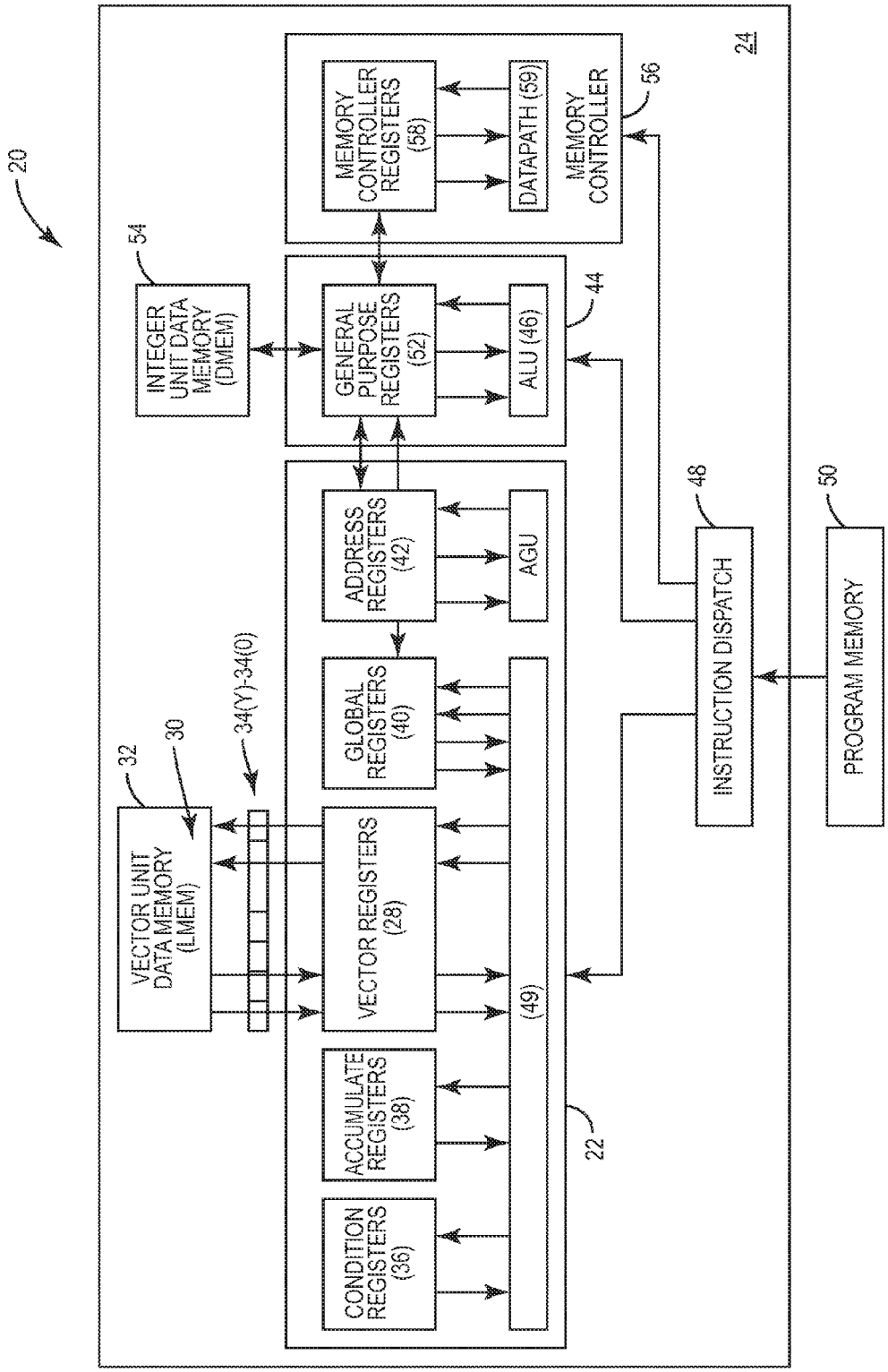
FIG. 2 is a schematic diagram of an exemplary vector processor that includes a common VPE having programmable data path configurations, so that common circuitry and hardware provided in the VPE can be programmed in multiple modes to perform specific types of vector operations in a highly efficient manner for multiple applications or technologies, without a need to provide separate VPEs.

In this regard, FIG. 2 is a schematic diagram of a baseband processor 20 that includes an exemplary vector processing unit 22, also referred to as a vector processing engine (VPE) 22. The baseband processor 20 and its VPE 22 can be provided in a semiconductor die 24. In this embodiment, as will be discussed in more detail below starting at FIG. 3, the baseband processor 20 includes a common VPE 22 that has programmable data path configurations. In this manner, the VPE 22 includes common circuitry and hardware that can be programmed and reprogrammed to provide different, specific types of vector operations in different operation modes without the requirement to provide separate VPEs in the baseband processor 20. The VPE 22 can also be programmed in a vector arithmetic mode for performing general arithmetic operations in a highly efficient manner for multiple applications or technologies, without the requirement to provide separate VPEs in the baseband processor 20.

Figure 3:
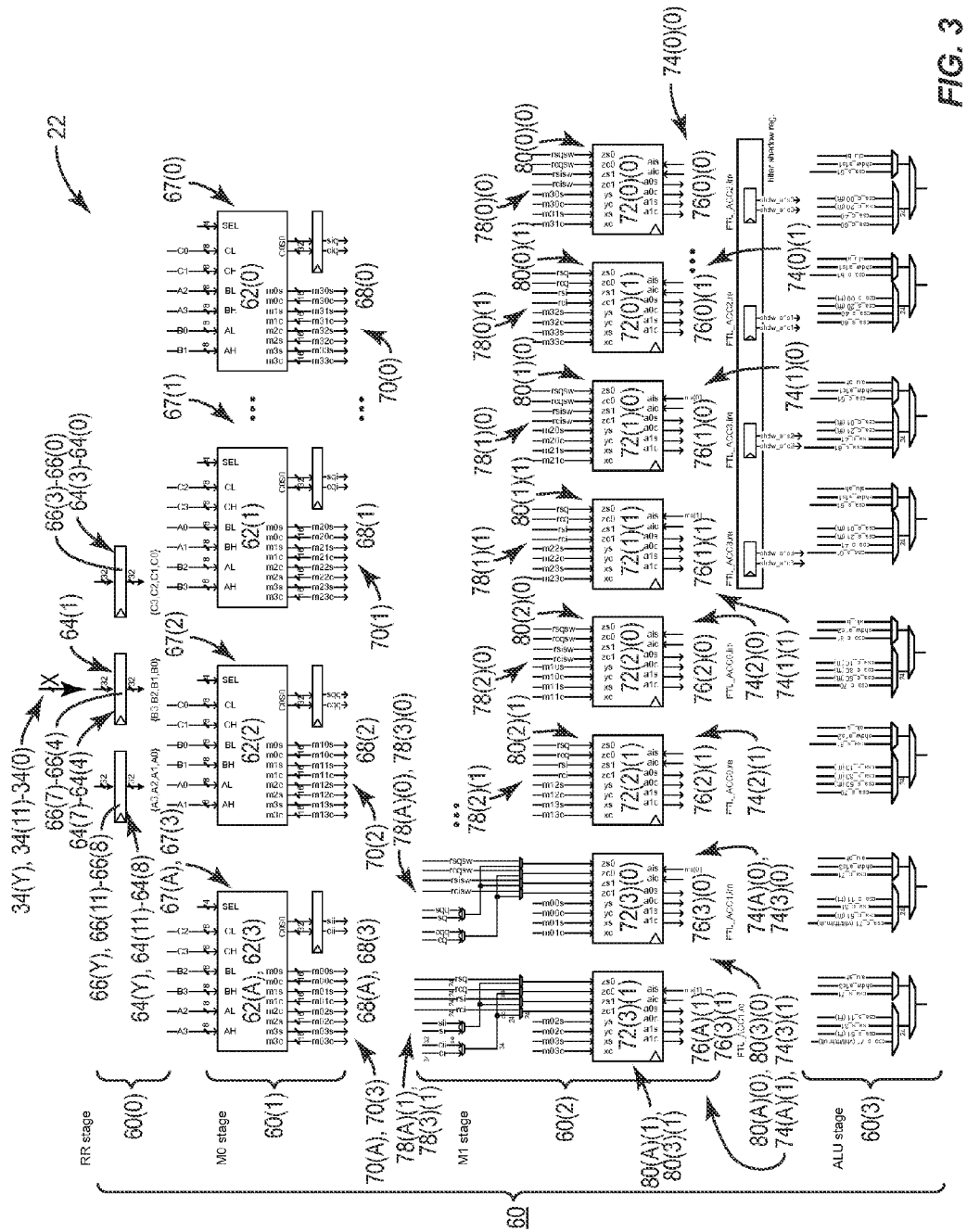
FIG. 3 is a schematic diagram of exemplary vector processing stages provided in the VPE of FIG. 2, wherein certain of the vector processing stages include exemplary vector processing blocks having programmable data path configurations.

Before discussing the programmable data path configurations provided in the VPE 22 for vector multi-mode processing starting with FIG. 3, the components of the baseband processor 20 in FIG. 2 are first described. The baseband processor 20 in this non-limiting example is a 512-bit vector processor. The baseband processor 20 includes additional components in addition to the VPE 22 to support the VPE 22 providing vector processing in the baseband processor 20. The baseband processor 20 includes vector registers 28 that are configured to receive and store vector data 30 from a vector unit data memory (LMEM) 32. For example, the vector data 30 is X bits wide, with 'X' defined according to design choice (e.g., 512 bits). The vector data 30 may be divided into vector data sample sets 34. For example, the vector data 30 may be 256-bits wide and may comprise smaller vector data sample sets 34(Y)-34(0), where some of the vector data sample sets 34(Y)-34(0) are 16-bits wide, and others of the vector data sample sets 34(Y)-34(0) are 32-bits wide. The VPE 22 is capable of providing vector processing on certain chosen multiply vector data sample sets 34(Y)-34(0) provided in parallel to the VPE 22 to achieve a high degree of parallelism. The vector registers 28 are also configured to store results generated when the VPE 22 processes the vector data 30. In certain embodiments, the VPE 22 is configured to not store intermediate vector processing results in the vector registers 28 to reduce register writes to provide faster vector instruction execution times. This configuration is opposed to scalar instructions executed by scalar processing engines that store intermediate results in registers, such as scalar processing DSPs.

The baseband processor 20 in FIG. 2 also includes condition registers 36 configured to provide conditions to the VPE 22 for use in conditional execution of vector instructions and to store updated conditions as a result of vector instruction execution. The baseband processor 20 also includes accumulate registers 38, global registers 40, and address registers 42. The accumulate registers 38 are configured to be used by the VPE 22 to store accumulated results as a result of executing certain specialized operations on the vector data 30. The global registers 40 are configured to store scalar operands for certain vector instructions supported by the VPE 22. The address registers 42 are configured to store addresses addressable by vector load and store instructions supported by the VPE 22 to retrieve the vector data 30 from the vector unit data memory 32 and store vector processing results in the vector unit data memory 32.

With continuing reference to FIG. 2, the baseband processor 20 in this embodiment also includes a scalar processor 44 (also referred to as "integer unit") to provide scalar processing in the baseband processor 20 in addition to vector processing provided by the VPE 22. It may be desired to provide a CPU configured to support both vector and scalar instruction operations based on the type of instruction executed for highly efficient operation. In this embodiment, the scalar processor 44 is a 32-bit reduced instruction set computing (RISC) scalar processor as a non-limiting example. The scalar processor 44 includes an arithmetic logic unit (ALU) 46 for supporting scalar instruction processing in this example. The baseband processor 20 includes an instruction dispatch circuit 48 configured to fetch instructions from program memory 50, decode the fetched instructions, and direct the fetched instructions to either the scalar processor 44 or through the vector datapath 49 to the VPE 22 based on instruction type. The scalar processor 44 includes general purpose registers 52 for use by the scalar processor 44 when executing scalar instructions. An integer unit data memory (DMEM) 54 is included in the baseband processor 20 to provide data from main memory into the general purpose registers 52 for access by the scalar processor 44 for scalar instruction execution. The DMEM 54 may be cache memory as a non-limiting example. The baseband processor 20 also includes a memory controller 56 that includes memory controller registers 58 configured to receive memory addresses from the general purpose registers 52 when the scalar processor 44 is executing vector instructions requiring access to main memory through memory controller data paths 59.

Now that the exemplary components of the baseband processor 20 in FIG. 2 have been described, more detail regarding the VPE 22 and its programmable data path configurations providing multiple modes of operation with common circuitry and hardware are now discussed. In this regard, FIG. 3 illustrates an exemplary schematic diagram of the VPE 22 in FIG. 2. As illustrated in FIG. 3 and as will be described in more detail below in FIGS. 4-8C, the VPE 22 includes a plurality of exemplary vector processing stages 60 having exemplary vector processing blocks that may be configured with programmable data path configurations. As will be discussed in more detail below, the programmable data path configurations provided in the vector processing blocks allow specific circuits and hardware to be programmed and reprogrammed to support performing different, specific vector processing operations on the vector data 30 received from the vector unit data memory 32 in FIG. 2.

For example, certain vector processing operations may commonly require multiplication of the vector data 30 followed by an accumulation of the multiplied vector data results. Non-limiting examples of such vector processing includes filtering operations, correlation operations, and Radix-2 and Radix-4 butterfly operations commonly used for performing Fast Fourier Transform (FFT) operations for wireless communications algorithms, where a series of parallel multiplications are provided followed by a series of parallel accumulations of the multiplication results. As will also be discussed in more detail below with regard to FIGS. 7-9C, the VPE 22 in FIG. 2 also has the option of fusing multipliers with carry-save accumulators to provide redundant carry-save format in the carry-save accumulators. Providing a redundant carry-save format in the carry-save accumulators can eliminate a need to provide a carry propagation path and a carry propagation add operation during each step of accumulation.

In this regard, with further reference to FIG. 3, a M0 multiply vector processing stage 60(1) of the VPE 22 will first be described. The M0 multiply vector processing stage 60(1) is a second vector processing stage containing a plurality of vector processing blocks in the form of any desired number of multiplier blocks 62(A)-62(0), each having programmable data path configurations. The multiplier blocks 62(A)-62(0) are provided to perform vector multiply operations in the VPE 22. The plurality of multiplier blocks 62(A)-62(0) are disposed in parallel to each other in the M0 multiply vector processing stage 60(1) for providing multiplication of up to twelve (12) multiply vector data sample sets 34(Y)-34(0). In this embodiment, 'A' is equal to three (3), meaning four (4) multiplier blocks 62(3)-62(0) are included in the M0 multiply vector processing stage 60(1) in this example. The multiply vector data sample sets 34(Y)-34(0) are loaded into the VPE 22 for vector processing into a plurality of latches 64(Y)-64(0) provided in an input read (RR) vector processing stage, which is a first vector processing stage 60(0) in the VPE 22. There are twelve (12) latches 64(11)-64(0) in the VPE 22 in this embodiment, meaning that 'Y' is equal to eleven (11) in this embodiment. The latches 64(11)-64(0) are configured to latch the multiply vector data sample sets 34(11)-34(0) retrieved from the vector registers 28 (see FIG. 2) as vector data input sample sets 66(11)-66(0). In this example, each latch 64(11)-64(0) is 8-bits wide. The latches 64(11)-64(0) are each respectively configured to latch the multiply vector data input sample sets 66(11)-66(0), for a total of 96-bits wide of vector data 30 (i.e., 12 latches×8 bits each).

With continuing reference to FIG. 3, the plurality of multiplier blocks 62(3)-62(0) are configured to be able to receive certain combinations of the vector data input sample sets 66(11)-66(0) for providing vector multiply operations, wherein 'Y' is equal to eleven (11) in this example. The multiply vector data input sample sets 66(11)-66(0) are provided in a plurality of input data paths A3-A0, B3-B0, and C3-C0 according to the design of the VPE 22. Vector data input sample sets 66(3)-66(0) correspond to input data paths C3-C0 as illustrated in FIG. 3. Vector data input sample sets 66(7)-66(4) correspond to input data paths B3-B0 as illustrated in FIG. 3. Vector data input sample sets 66(11)-66(8) correspond to input data paths A3-A0 as illustrated in FIG. 3. The plurality of multiplier blocks 62(3)-62(0) are configured to process the received vector data input sample sets 66(11)-66(0) according to the input data paths A3-A0, B3-B0, C3-C0, respectively, provided to the plurality of multiplier blocks 62(3)-62(0), to provide vector multiply operations.

As will be discussed in more detail below with regard to FIGS. 4 and 5, programmable internal data paths 67(3)-67(0) provided in the multiplier blocks 62(3)-62(0) in FIG. 3 can be programmed to have different data path configurations. These different data path configurations provide different combinations and/or different bit lengths of multiplication of particular received vector data input sample sets 66(11)-66(0) provided to the multiplier blocks 62(3)-62(0) according to the particular input data paths A3-A0, B3-B0, C3-C0 provided to each multiplier block 62(3)-62(0). In this regard, the plurality of multiplier blocks 62(3)-62(0) provide vector multiply output sample sets 68(3)-68(0) as a vector result output sample set comprising a multiplication result of multiplying a particular combination of the vector data input sample sets 66(11)-66(0) together.

For example, the programmable internal data paths 67(3)-67(0) of the multiplier blocks 62(3)-62(0) may be programmed according to settings provided from a vector instruction decoder in the instruction dispatch 48 of the baseband processor 20 in FIG. 2. In this embodiment, there are four (4) programmable internal data paths 67(3)-67(0) of the multiplier blocks 62(3)-62(0). The vector instruction specifies the specific type of operation to be performed by the VPE 22. Thus, the VPE 22 can be programmed and reprogrammed to configure the programmable internal data paths 67(3)-67(0) of the multiplier blocks 62(3)-62(0) to provide different types of vector multiply operations with the same common circuitry in a highly efficient manner. For example, the VPE 22 may be programmed to configure and reconfigure the programmable internal data paths 67(3)-67(0) of the multiplier blocks 62(3)-62(0) on a cycle-by-clock cycle basis for each vector instruction executed, according to decoding of the vector instructions in an instruction pipeline in the instruction dispatch 48. Thus, if the M0 multiply vector processing stage 60(1) in the VPE 22 is configured to process vector data input sample sets 66 every clock cycle, as a result, the multiplier blocks 62(3)-62(0) perform vector multiply operations on every clock cycle according to decoding of the vector instructions in an instruction pipeline in the instruction dispatch 48.

Figure 6:
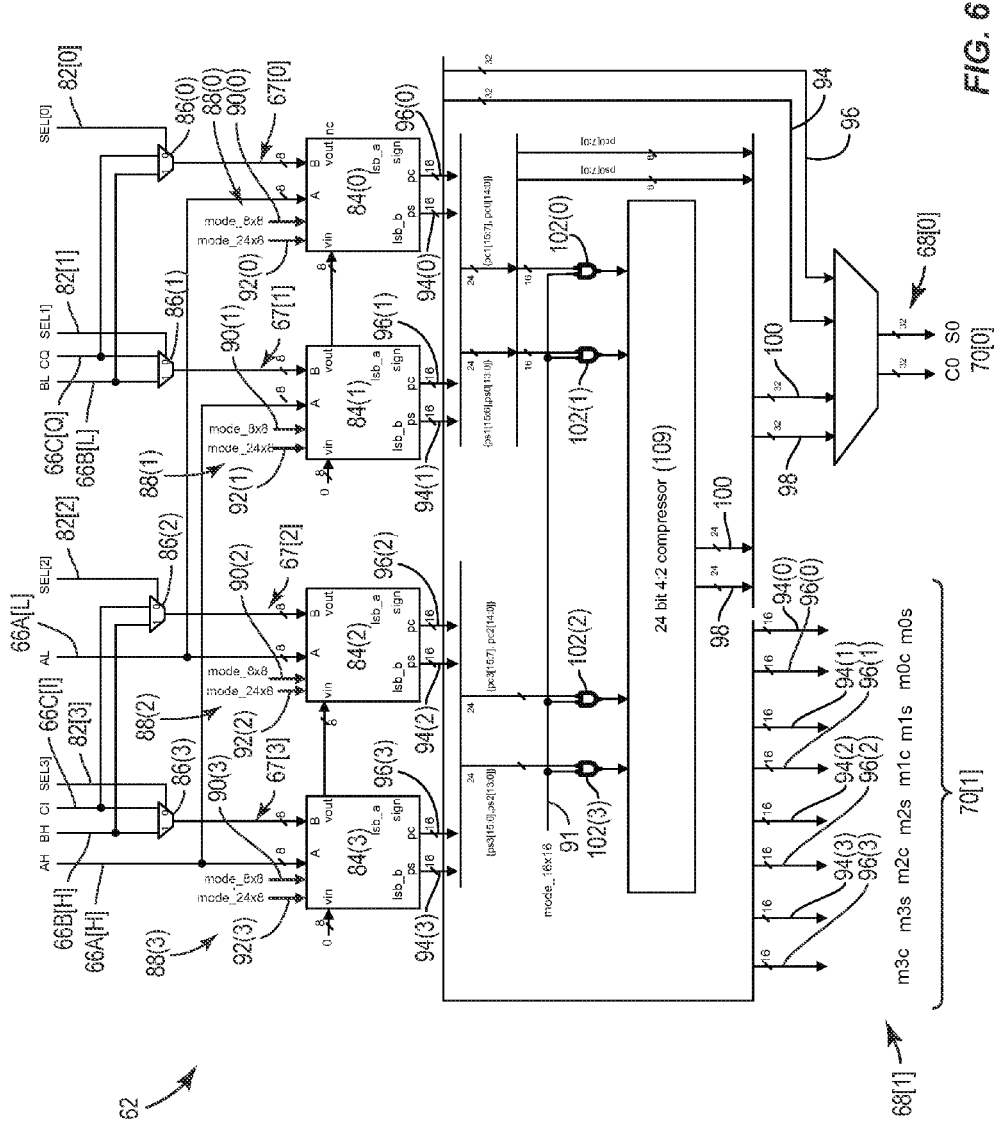
FIG. 6 is a schematic diagram of internal components of a multiplier block among the plurality of multiplier blocks in FIG. 5 having programmable data paths configurations capable of being programmed to provide multiply operations for 8-bit by 8-bit vector data input sample sets and 16-bit by 16-bit vector data input sample sets.

The multiplier blocks 62 can be programmed to perform real and complex multiplications. With continuing reference to FIG. 3, in one vector processing block data path configuration, a multiplier block 62 may be configured to multiply two 8-bit vector data input sample sets 66 together. In one multiply block data path configuration, a multiplier block 62 may be configured to multiply to two 16-bit vector data input sample sets 66 together, which are formed from a first pair of 8-bit vector data input sample sets 66 multiplied by a second pair of 8-bit vector data input sample sets 66. This is illustrated in FIG. 6 and discussed in more detail below. Again, providing the programmable data path configurations in the multiplier blocks 62(3)-62(0) provides flexibility in that the multiplier blocks 62(3)-62(0) can be configured and reconfigured to perform different types of multiply operations to reduce area in the VPE 22 and possible allow fewer VPEs 22 to be provided in the baseband processor 20 to carry out the desired vector processing operations.

With reference back to FIG. 3, the plurality of multiplier blocks 62(3)-62(0) are configured to provide the vector multiply output sample sets 68(3)-68(0) in programmable output data paths 70(3)-70(0) to either the next vector processing stage 60 or an output processing stage. The vector multiply output sample sets 68(3)-68(0) are provided in the programmable output data paths 70(3)-70(0) according to a programmed configuration based on the vector instruction being executed by the plurality of multiplier blocks 62(3)-62(0). In this example, the vector multiply output sample sets 68(3)-68(0) in the programmable output data paths 70(3)-70(0) are provided to the M1 accumulation vector processing stage 60(2) for accumulation, as will be discussed below. In this specific design of the VPE 22, it is desired to provide the plurality of multiplier blocks 62(3)-62(0) followed by accumulators to support specialized vector instructions that call for multiplications of vector data inputs followed by accumulation of the multiplied results. For example, Radix-2 and Radix-4 butterfly operations commonly used to provide FFT operations include a series of multiply operations followed by an accumulation of the multiplication results. However, note that these combinations of vector processing blocks provided in the VPE 22 are exemplary and not limiting. A VPE that has programmable data path configurations could be configured to include one or any other number of vector processing stages having vector processing blocks. The vector processing blocks could be provided to perform any type of operations according to the design and specific vector instructions designed to be supported by a VPE.

With continued reference to FIG. 3, in this embodiment, the vector multiply output sample sets 68(3)-68(0) are provided to a plurality of accumulator blocks 72(3)-72(0) provided in a next vector processing stage, which is the M1 accumulation vector processing stage 60(2). Each accumulator block among the plurality of accumulator blocks 72(A)-72(0) contains two accumulators 72(X)(1) and 72(X)(0) (i.e., 72(3)(1), 72(3)(0), 72(2)(1), 72(2)(0), 72(1)(1), 72(1)(0), and 72(0)(1), 72(0)(0)). The plurality of accumulator blocks 72(3)-72(0) accumulate the results of the vector multiply output sample sets 68(3)-68(0). As will be discussed in more detail below with regard to FIGS. 7-9C, the plurality of accumulator blocks 72(3)-72(0) can be provided as carry-save accumulators, wherein the carry product is in essence saved and not propagated during the accumulation process until the accumulation operation is completed. The plurality of accumulator blocks 72(3)-72(0) also have the option of being fused with the plurality of multiplier blocks 62(3)-62(0) in FIGS. 4 and 5 to provide redundant carry-save format in the plurality of accumulator blocks 72(3)-72(0). Providing redundant carry-save format in the plurality of accumulator blocks 72(3)-72(0) can eliminate a need to provide a carry propagation path and a carry propagation add operation during each step of accumulation in the plurality of accumulator blocks 72(3)-72(0). The M1 accumulation vector processing stage 60(2) and its plurality of accumulator blocks 72(3)-72(0) will now be introduced with reference to FIG. 3.

With reference to FIG. 3, the plurality of accumulator blocks 72(3)-72(0) in the M1 accumulation vector processing stage 60(2) are configured to accumulate the vector multiply output sample sets 68(3)-68(0) in programmable output data paths 74(3)-74(0) (i.e., 74(3)(1), 74(3)(0), 74(2)(1), 74(2)(0), 74(1)(1), 74(1)(0), and 74(0)(1), 74(0)(0)), according to programmable output data path configurations, to provide accumulator output sample sets 76(3)-76(0) (i.e., 76(3)(1), 76(3)(0), 76(2)(1), 76(2)(0), 76(1)(1), 76(1)(0), and 76(0)(1), 76(0)(0)) in either a next vector processing stage 60 or an output processing stage. In this example, the accumulator output sample sets 76(3)-76(0) are provided to an output processing stage, which is an ALU processing stage 60(3). For example, as discussed in more detail below, the accumulator output sample sets 76(3)-76(0) can also be provided to the ALU 46 in the scalar processor 44 in the baseband processor 20 in FIG. 2, as a non-limiting example. For example, the ALU 46 may take the accumulator output sample sets 76(3)-76(0) according to the specialized vector instructions executed by the VPE 22 to be used in more general processing operations.

With reference back to FIG. 3, programmable input data paths 78(3)-78(0) and/or programmable internal data paths 80(3)-80(0) of the accumulator blocks 72(3)-72(0) can be programmed to be reconfigured to receive different combinations and/or bit lengths of the vector multiply output sample sets 68(3)-68(0) provided from the multiplier blocks 62(3)-62(0) to the accumulator blocks 72(3)-72(0). Because each accumulator block 72 is comprised of two accumulators 72(X)(1), 72(X)(0), the programmable input data paths 78(A)-78(0) are shown in FIG. 3 as 78(3)(1), 78(3)(0), 78(2)(1), 78(2)(0), 78(1)(1), 78(1)(0), and 78(0)(1), 78(0)(0). Similarly, the programmable internal data paths 80(3)-80(A) are shown in FIG. 3 as 80(3)(1), 80(3)(0), 80(2)(1), 80(2)(0), 80(1)(1), 80(1)(0), 80(0)(1), 80(0)(0). Providing programmable input data paths 78(3)-78(0) and/or programmable internal data paths 80(3)-80(0) in the accumulator blocks 72(3)-72(0) is discussed in more detail below with regard to FIGS. 8-9C. In this manner, according to the programmable input data paths 78(3)-78(0) and/or the programmable internal data paths 80(3)-80(0) of the accumulator blocks 72(3)-72(0), the accumulator blocks 72(3)-72(0) can provide the accumulator output sample sets 76(3)-76(0) according to the programmed combination of accumulated vector multiply output sample sets 68(3)-68(0). Again, this provides flexibility in that the accumulator blocks 72(3)-72(0) can be configured and reconfigured to perform different types of accumulation operations based on the programming of the programmable input data paths 78(3)-78(0) and/or the programmable internal data paths 80(3)-80(0) to reduce area in the VPE 22 and possibly allow fewer VPEs 22 to be provided in the baseband processor 20 to carry out the desired vector processing operations.

Figure 9A:
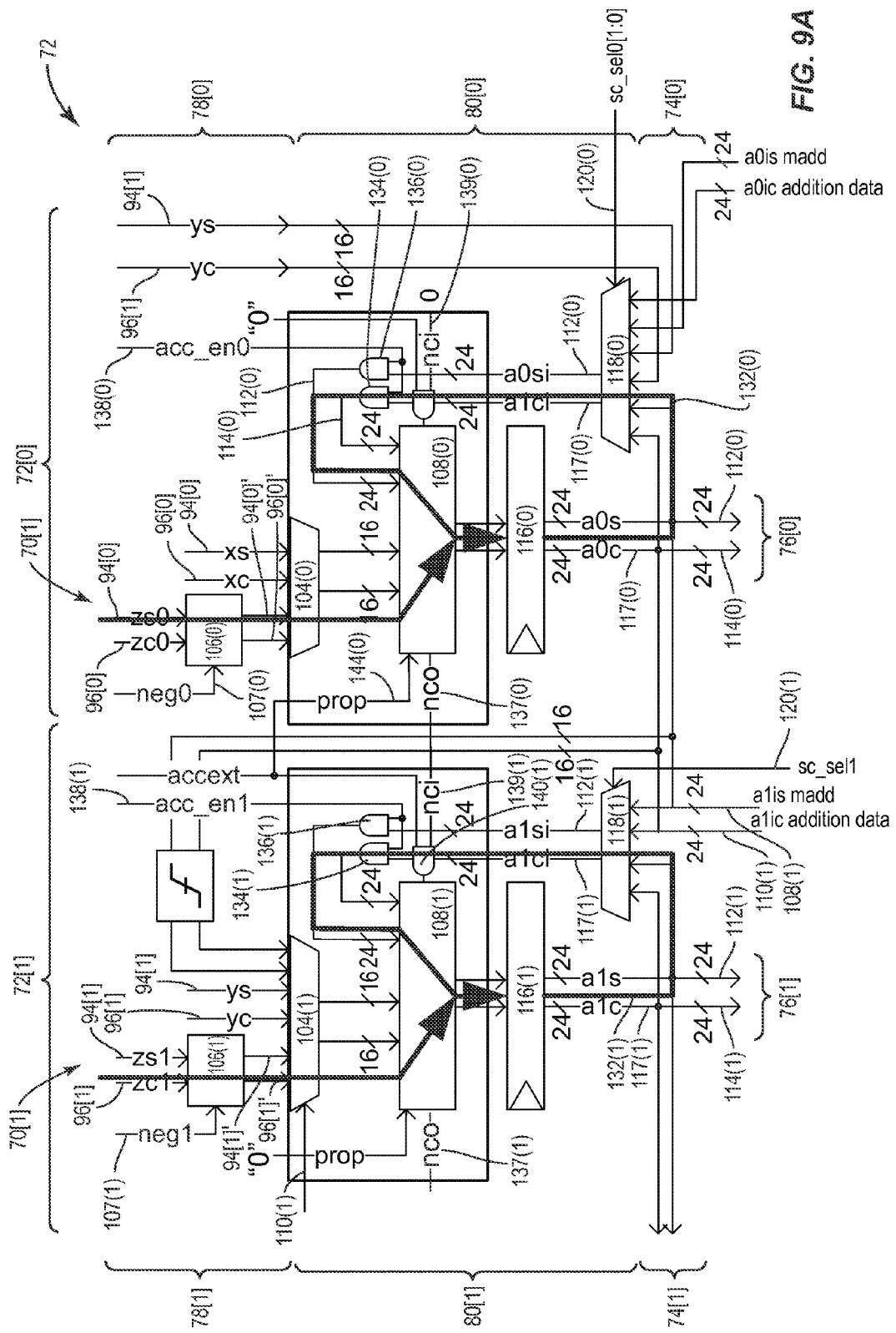
FIG. 9A is a schematic diagram of the accumulator block of FIG. 8 having data path configurations programmed for providing a dual 24-bit accumulator mode.
Figure 9B:
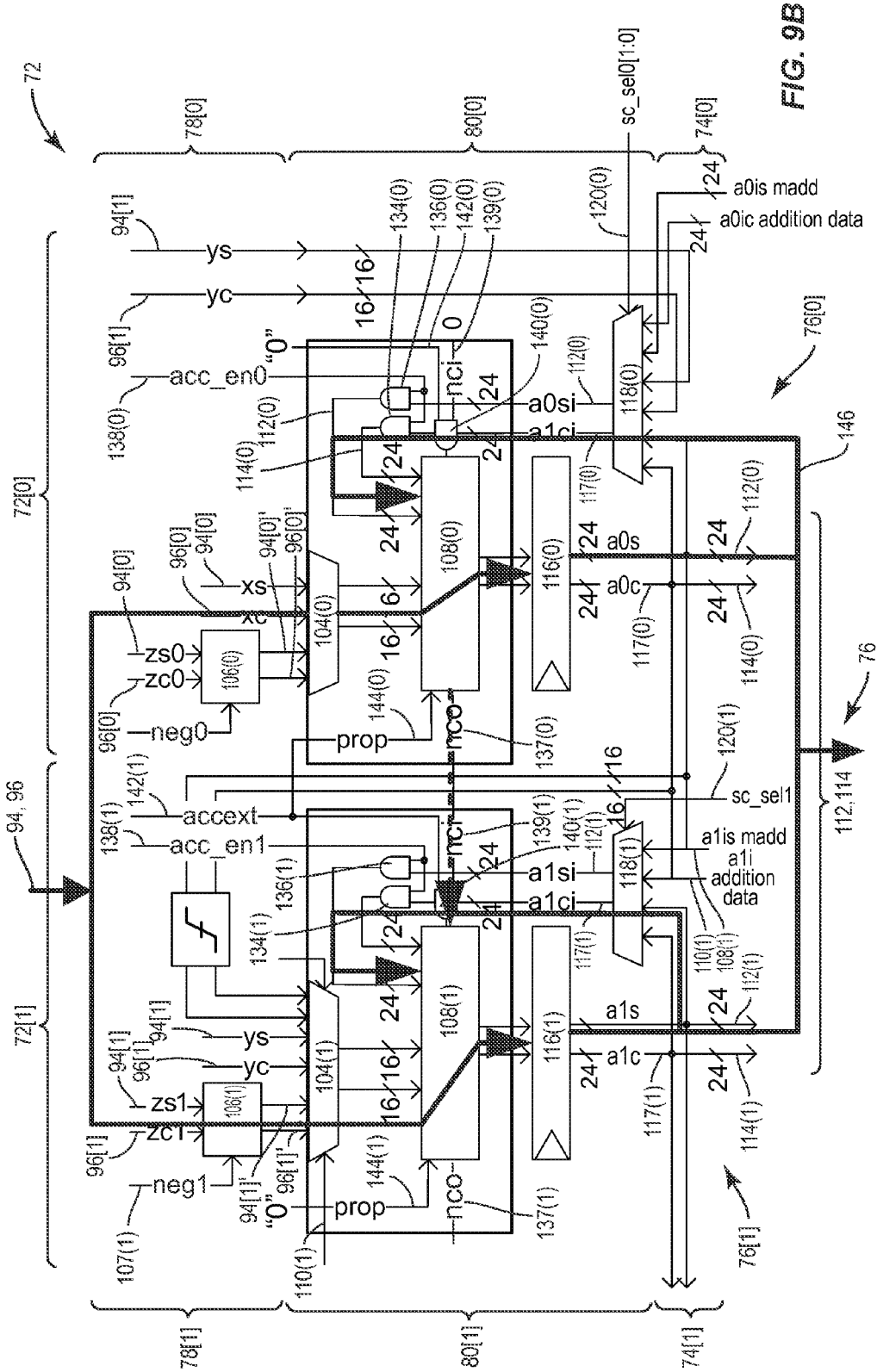
FIG. 9B is a schematic diagram of the accumulator block of FIG. 8 having data path configurations programmed for providing a single 40-bit accumulator mode.
Figure 9C:
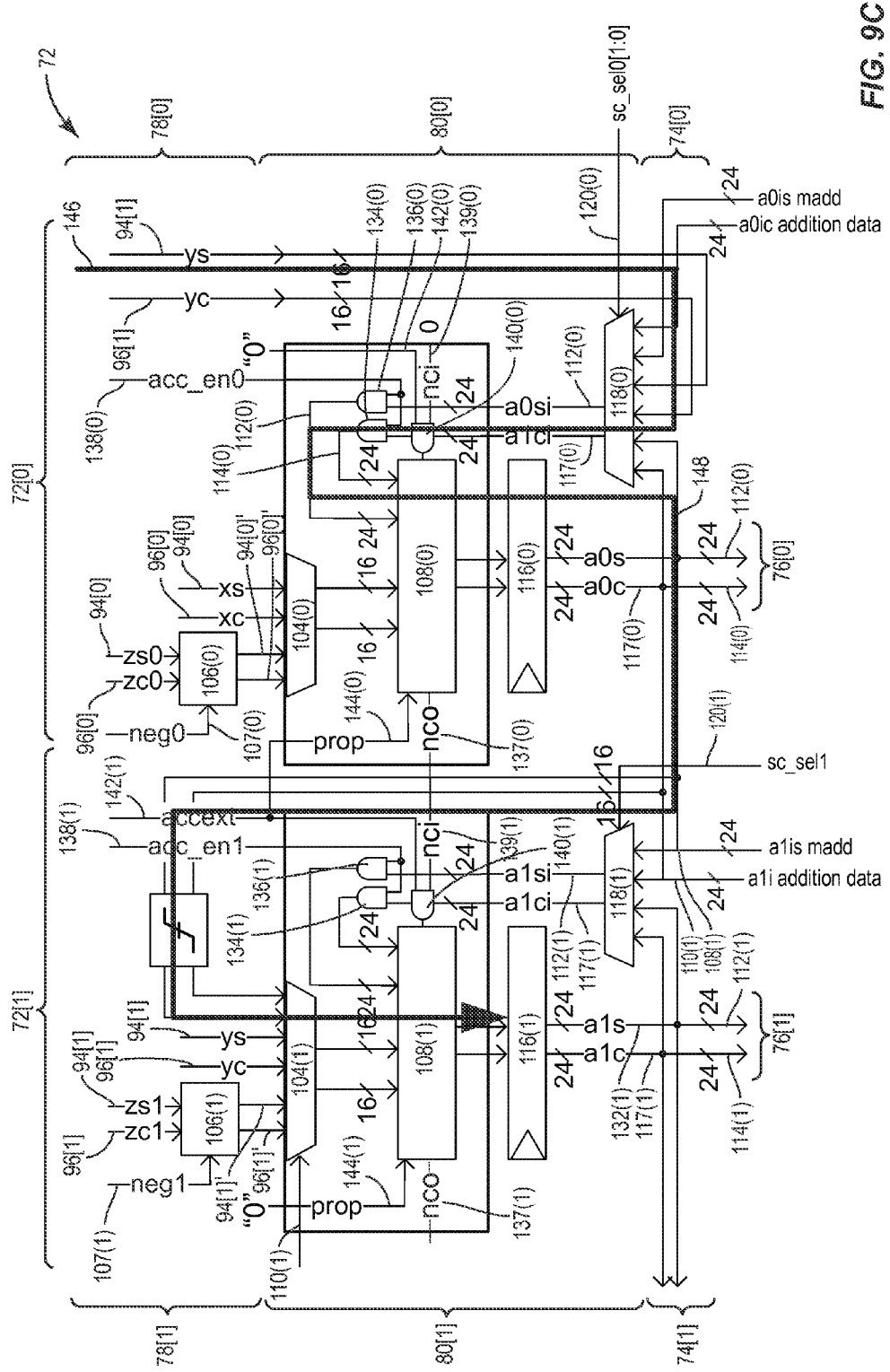
FIG. 9C is a schematic diagram of the accumulator block of FIG. 8 having data path configurations programmed for providing a 16-bit carry-save adder followed by a single 24-bit accumulator mode.

For example, in one accumulator mode configuration, the programmable input data path 78 and/or the programmable internal data paths 80 of two accumulator blocks 72 may be programmed to provide for a single 40-bit accumulator as a non-limiting example. This is illustrated in FIG. 9A and discussed in more detail below. In another accumulator mode configuration, the programmable input data path 78 and/or the programmable internal data path 80 of two accumulator blocks 72 may be programmed to provide for dual 24-bit accumulators as a non-limiting example. This is illustrated in FIG. 9B and discussed in more detail below. In another accumulator mode configuration, the programmable input data path 78 and/or the programmable internal data path 80 of two accumulator blocks 72 may be programmed to provide for a 16-bit carry-save adder followed by a single 24-bit accumulator. This is illustrated in FIG. 9C and discussed in more detail below. Specific, different combinations of multiplications and accumulation operations can also be supported by the VPE 22 according to the programming of the multiplier blocks 62(3)-62(0) and the accumulator blocks 72(3)-72(0) (e.g., 16-bit complex multiplication with 16-bit accumulation, and 32-bit complex multiplication with 16-bit accumulation).

The programmable input data paths 78(3)-78(0) and/or the programmable internal data paths 80(3)-80(0) of the accumulator blocks 72(3)-72(0) may be programmed according to settings provided from a vector instruction decoder in the instruction dispatch 48 of the baseband processor 20 in FIG. 2. The vector instruction specifies the specific type of operation to be performed by the VPE 22. Thus, the VPE 22 can be configured to reprogram the programmable input data paths 78(3)-78(0) and/or the programmable internal data paths 80(3)-80(0) of the accumulator blocks 72(3)-72(0) for each vector instruction executed according to decoding of the vector instruction in an instruction pipeline in the instruction dispatch 48. A vector instruction may execute over one or more clock cycles of the VPE 22. Also in this example, the VPE 22 can be configured to reprogram the programmable input data paths 78(3)-78(0) and/or the programmable internal data paths 80(3)-80(0) of the accumulator blocks 72(3)-72(0) for each clock cycle of a vector instruction on a clock cycle-by-clock cycle basis. Thus, for example, if a vector instruction executed by the M1 accumulation vector processing stage 60(2) in the VPE 22 processes the vector multiply output sample sets 68(3)-68(0) every clock cycle, as a result, the programmable input data paths 78(3)-78(0) and/or the programmable internal data paths 80(3)-80(0) of the accumulator blocks 72(3)-72(0) can be reconfigured each clock cycle during execution of the vector instruction.

Figure 4A:
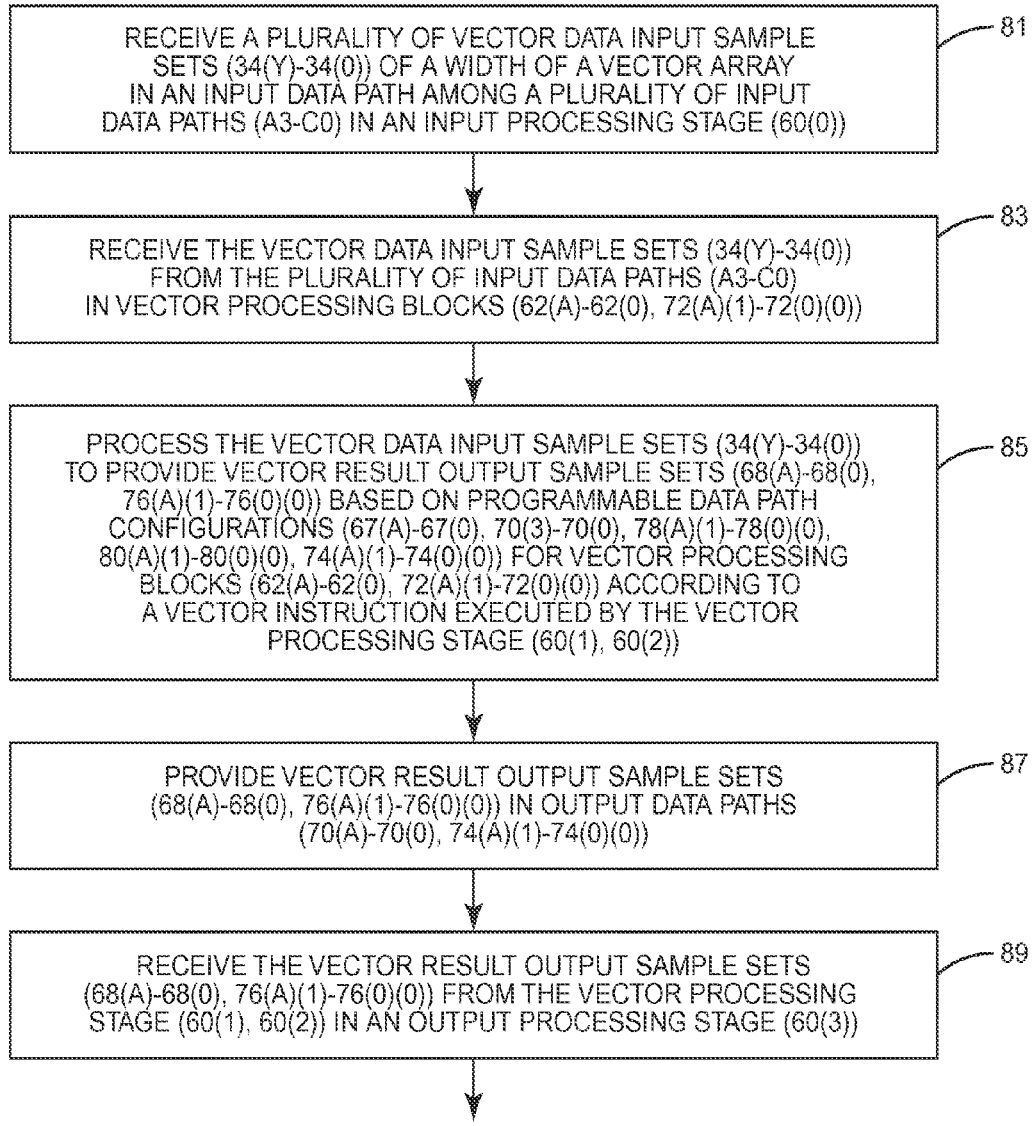
FIG. 4A is a flowchart illustrating exemplary vector processing of at least one vector processing block having programmable data path configurations included in the exemplary vector processor of FIGS. 2 and 3.
Figure 4B:
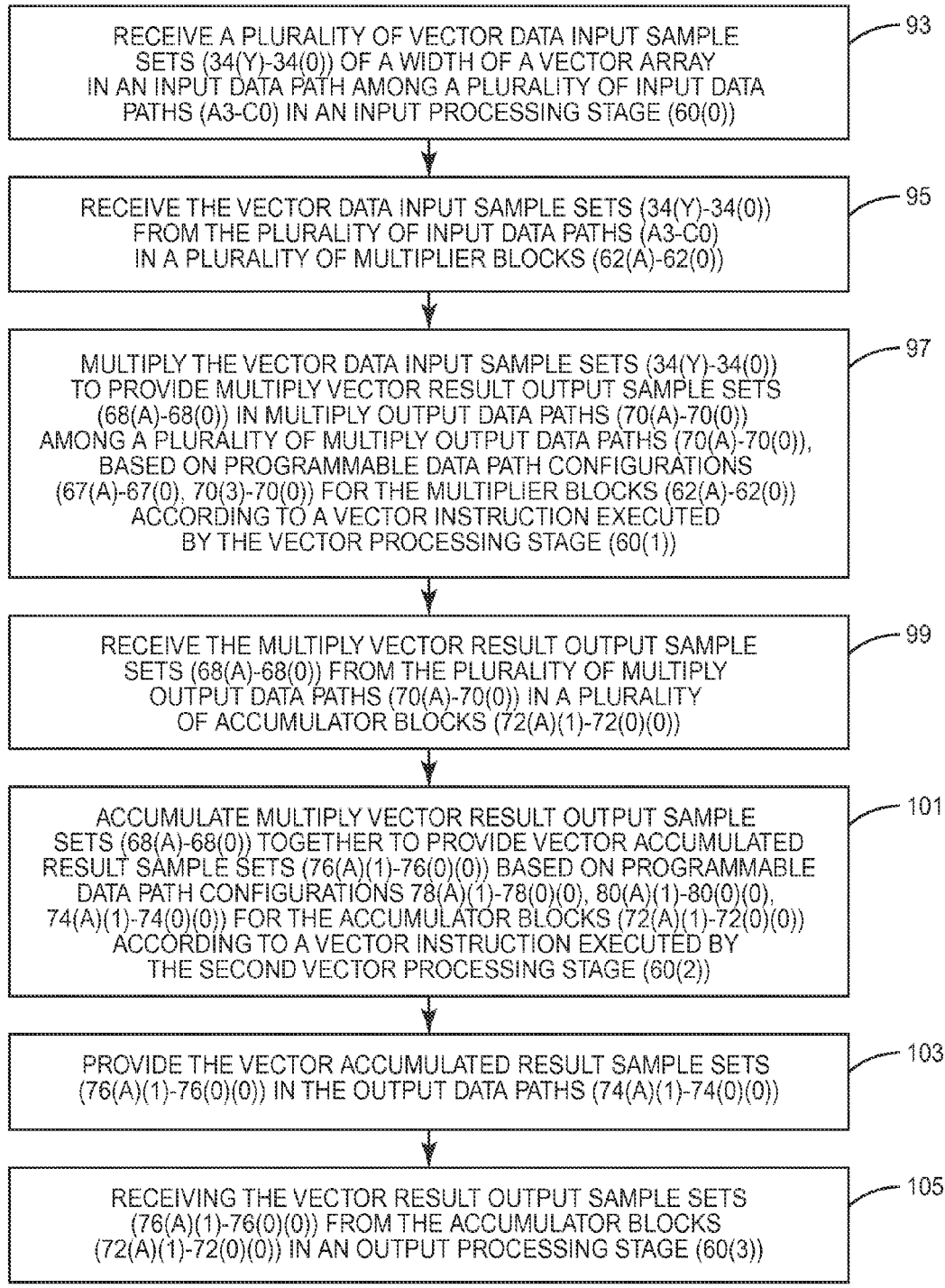
FIG. 4B is a flowchart illustrating exemplary vector processing of multiplier blocks and accumulator blocks, each having programmable data path configurations and provided in different vector processing stages in the exemplary vector processor of FIGS. 2 and 3.

FIGS. 4A and 4B are flowcharts illustrating exemplary vector processing of the multiplier blocks 62(A)-62(0) and the accumulator blocks 72(A)(1)-72(0)(0) in the VPE 22 in FIGS. 2 and 3 to provide more illustration of the exemplary vector processing. FIG. 4A is a flowchart illustrating exemplary vector processing of a generalized vector processing block, which could be either the multiplier blocks 62(A)-62(0), the accumulator blocks 72(A)(1)-72(0)(0), or both, having programmable data path configurations included in the exemplary VPE of FIGS. 2 and 3. FIG. 4B is a flowchart illustrating exemplary vector processing of multiplier blocks 62(A)-62(0) and accumulator blocks 72(A)(1)-72(0)(0) each having programmable data path configurations and provided in different vector processing stages in the exemplary VPE 22 of FIGS. 2 and 3.

In this regard, as illustrated in FIG. 4A, the process of the VPE 22 includes receiving a plurality of vector data input sample sets 34(Y)-34(0) of a width of a vector array in an input data path among a plurality of input data paths (A3-C0) in an input processing stage 60(0) (block 81). The vector processing next comprises receiving the vector data input sample sets 34(Y)-34(0) from the plurality of input data paths A3-C0 in vector processing blocks 62(A)-62(0) and/or 72(A)(1)-72(0)(0) (block 83). The vector processing next includes processing the vector data input sample sets 34(Y)-34(0) to provide vector result output sample sets 68(A)-68(0), 76(A)(1)-76(0)(0) based on programmable data path configurations 67(A)-67(0), 70(3)-70(0), 78(A)(1)-78(0)(0), 80(A)(1)-80(0)(0), 74(A)(1)-74(0)(0) for vector processing blocks 62(A)-62(0), 72(A)(1)-72(0)(0) according to a vector instruction executed by the vector processing stage 60(1), 60(2) (block 85). The vector processing next includes providing the vector result output sample sets 68(A)-68(0), 76(A)(1)-76(0)(0) in output data paths 70(A)-70(0), 74(A)(1)-74(0)(0) (block 87). The vector processing next includes receiving the vector result output sample sets 68(A)-68(0), 76(A)(1)-76(0)(0) from the vector processing stage 60(1), 60(2) in an output processing stage 60(3) (block 89).

Note that each processing stage 60(0)-60(3) in the vector processing described above with regard to FIG. 4A occurs concurrently for parallelization vector processing, wherein the programmable data path configurations 67(A)-67(0), 70(3)-70(0), 78(A)(1)-78(0)(0), 80(A)(1)-80(0)(0), 74(A)(1)-74(0)(0) of the vector processing blocks 62(A)-62(0), 72(A)(1)-72(0)(0) can be reprogrammed as often as each clock cycle. As discussed above, this allows the vector processing blocks 62(A)-62(0), 72(A)(1)-72(0)(0) to perform different operations for different vector instructions efficiently, and through the use of common vector processing blocks 62(A)-62(0), 72(A)(1)-72(0)(0).

FIG. 4B is a flowchart illustrating exemplary vector processing of the multiplier blocks 62(A)-62(0) and accumulator blocks 72(A)(1)-72(0)(0) in the VPE 22 in FIG. 3 for vector instructions involving multiply operations followed by accumulate operations. For example, FFT vector operations involve multiply operations followed by accumulate operations. The flowchart of FIG. 4B provides further exemplary detail of the exemplary generalized vector processing of the VPE 22 described above in FIG. 4A. In this regard, the vector processing involves receiving a plurality of vector data input sample sets 34(Y)-34(0) of a width of a vector array in an input data path among a plurality of input data paths A3-C0 in an input processing stage 60(0) (block 93). The vector processing then includes receiving the vector data input sample sets 34(Y)-34(0) from the plurality of input data paths A3-C0 in a plurality of multiplier blocks 62(A)-62(0) (block 95). The vector processing then includes multiplying the vector data input sample sets 34(Y)-34(0) to provide multiply vector result output sample sets 68(A)-68(0) in multiply output data paths 70(A)-70(0) among a plurality of multiply output data paths 70(A)-70(0), based on programmable data path configurations 67(A)-67(0), 70(3)-70(0) for the multiplier blocks 62(A)-62(0) according to a vector instruction executed by the vector processing stage 60(1) (block 97). The vector processing next includes receiving the multiply vector result output sample sets 68(A)-68(0) from the plurality of multiply output data paths 70(A)-70(0) in a plurality of accumulator blocks 72(A)(1)-72(0)(0) (block 99). The vector processing next includes accumulating multiply vector result output sample sets 68(A)-68(0) together to provide vector accumulated result sample sets 76(A)(1)-76(0)(0) based on programmable data path 78(A)(1)-78(0)(0), 80(A)(1)-80(0)(0), 74(A)(1)-74(0)(0) configurations for the accumulator blocks 72(A)(1)-72(0)(0) according to a vector instruction executed by the second vector processing stage 60(2) (block 101). The vector processing then includes providing the vector accumulated result sample sets 76(A)(1)-76(0)(0) in the output data paths 74(A)(1)-74(0)(0) (block 103). The vector processing then includes receiving the vector result output sample sets 76(A)(1)-76(0)(0) from the accumulator blocks 72(A)(1)-72(0)(0) in an output processing stage 60(3) (block 105).

Now that the overview of the exemplary VPE 22 of FIG. 3 and vector processing in FIGS. 4A and 4B employing vector processing blocks having programmable data path configurations have been described, the remainder of the description describes more exemplary, non-limiting details of these vector processing blocks in FIGS. 5-9C.

Figure 5:
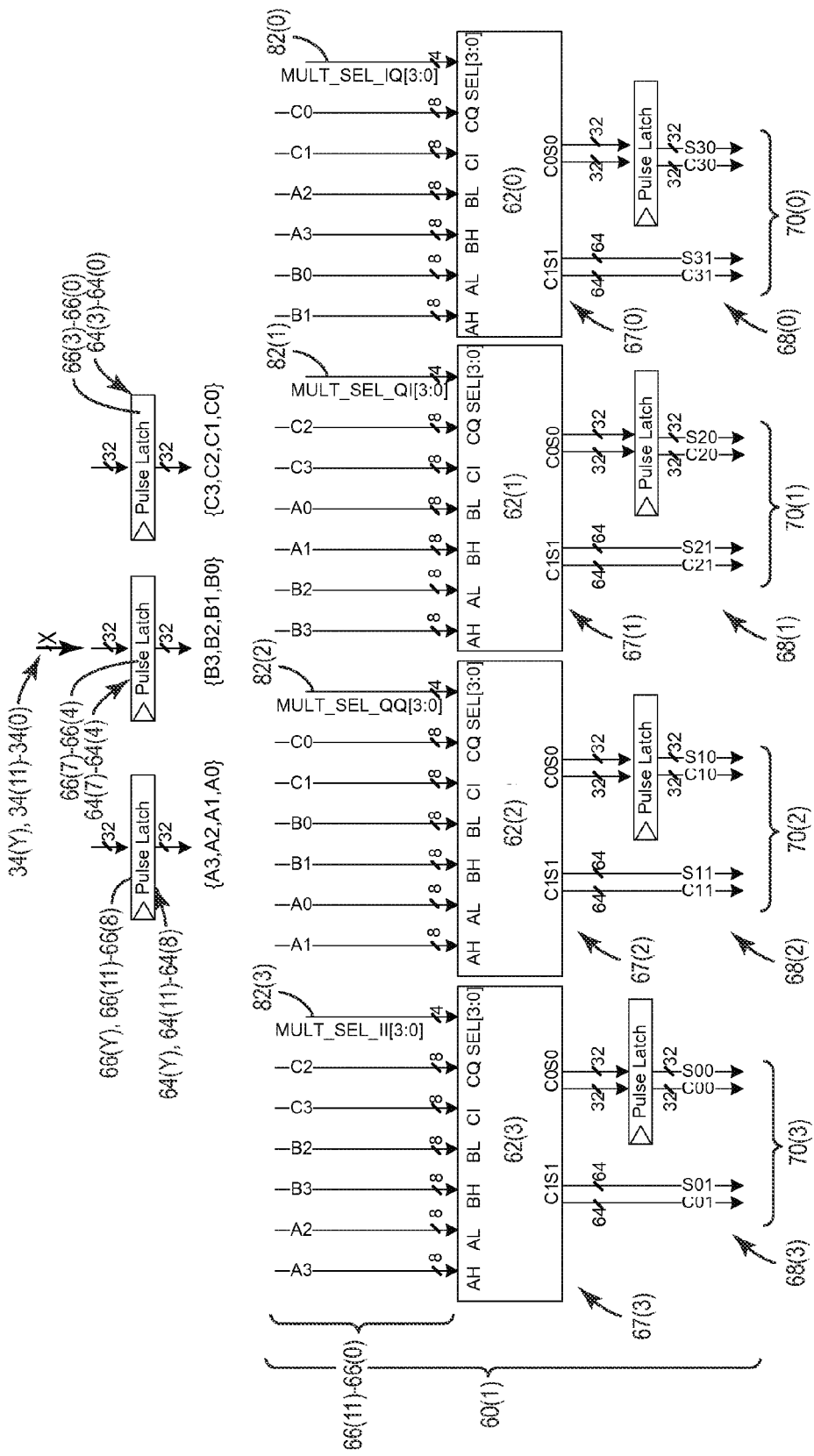
FIG. 5 is a more detailed schematic diagram of a plurality of multiplier blocks provided in a vector processing stage of the VPE of FIGS. 2 and 3, wherein the plurality of multiplier blocks each have programmable data path configurations, so that the plurality of multiplier blocks can be programmed in multiple modes to perform specific, different types of vector multiply operations.

In this regard, FIG. 5 is a more detailed schematic diagram of the plurality of multiplier blocks 62(3)-62(0) in the M0 multiply vector processing stage 60(1) of the VPE 22 of FIG. 3. FIG. 6 is a schematic diagram of internal components of a multiplier block 62 in FIG. 5. As illustrated in FIG. 5, the vector data input sample sets 66(11)-66(0) that are received by the multiplier blocks 62(3)-62(0) according to the particular input data paths A3-A0, B3-B0, C3-C0 are shown. As will be discussed in more detail below with regard to FIG. 6, each of the multiplier blocks 62(3)-62(0) in this example include four (4) 8-bit by 8-bit multipliers. With reference back to FIG. 5, each of the multiplier blocks 62(3)-62(0) in this example are configured to multiply a multiplicand input 'A' by either multiplicand input 'B' or multiplicand input 'C." The multiplicand inputs 'A," and 'B' or 'C' that can be multiplied together in a multiplier block 62 are controlled by which input data paths A3-A0, B3-B0, C3-C0 are connected to the multiplier blocks 62(3)-62(0), as shown in FIG. 5. A multiplicand selector input 82(3)-82(0) is provided as an input to each multiplier block 62(3)-62(0) to control the programmable internal data paths 67(3)-67(0) in each multiplier block 62(3)-62(0) to select whether multiplicand input 'B' or multiplicand input 'C' is selected to be multiplied by multiplicand input 'A.' In this manner, the multiplier blocks 62(3)-62(0) are provided with the capability for their programmable internal data paths 67(3)-67(0) to be reprogrammed to provide different multiply operations, as desired.

With continuing reference to FIG. 5, using multiplier block 62(3) as an example, input data paths A3 and A2 are connected to inputs AH and AL, respectively. Input AH represents the high bits of multiplicand input A, and AL means the low bits of input multiplicand input 'A.' Input data paths B3 and B2 are connected to inputs BH and BL, respectively. Input BH represents the high bits of multiplicand input 'B,' and AL represents the low bits of input multiplicand input 'B." Input data paths C3 and C2 are connected to inputs CI and CQ, respectively. Input CI represents the real bits portion of input multiplicand input 'C' in this example. CQ represents the imaginary bits portion of input multiplicand input 'C' in this example. As will be discussed in more detail below with regard to FIG. 6, the multiplicand selector input 82(3) also controls whether the programmable internal data paths 67(3) of multiplier block 62(3) are configured to perform 8-bit multiplication on multiplicand input 'A' with multiplicand input 'B' or multiplicand input 'C,' or whether multiplier block 62(3) is configured to perform 16-bit multiplication on multiplicand input 'A' with multiplicand input 'B' or multiplicand input 'C' in this example.

With continuing reference to FIG. 5, the multiplier blocks 62(3)-62(0) are configured to each generate vector multiply output sample sets 68(3)-68(0) as carry 'C' and sum 'S' vector output sample sets of the multiplication operation based on the configuration of their programmable internal data paths 67(3)-67(0). As will be discussed in more detail below with regard to FIGS. 7-9C, the carry 'C' and sum 'S' of the vector multiply output sample sets 68(3)-68(0) are fused, meaning that the carry 'C' and the sum 'S' are provided in redundant carry-save format to the plurality of accumulators 72(3)-72(0) to provide redundant carry-save format in the plurality of accumulators 72(3)-72(0). As will be discussed in more detail below, providing a redundant carry-save format in the plurality of accumulators 72(3)-72(0) can eliminate a need to provide a carry propagation path and a carry propagation add operation during accumulation operations performed by the plurality of accumulators 72(3)-72(0).

Examples of the multiplier blocks 62(3)-62(0) generating the vector multiply output sample sets 68(3)-68(0) as carry 'C' and sum 'S' vector output sample sets of the multiplication operation based on the configuration of their programmable internal data paths 67(3)-67(0) are shown in FIG. 5. For example, multiplier block 62(3) is configured to generate carry C00 and sum S00 as 32-bit values for 8-bit multiplications and carry C01 and sum S01 as 64-bit values for 16-bit multiplications. The other multiplier blocks 62(2)-62(0) have the same capability in this example. In this regard, multiplier block 62(2) is configured to generate carry C10 and sum S10 as 32-bit values for 8-bit multiplications and carry C11 and sum S11 as 64-bit values for 16-bit multiplications. Multiplier block 62(1) is configured to generate carry C20 and sum S20 as 32-bit values for 8-bit multiplications and carry C21, and sum S21 as 64-bit values for 16-bit multiplications. Multiplier block 62(0) is configured to generate carry C30 and sum S30 as 32-bit values for 8-bit multiplications and carry C31 and sum S31 as 64-bit values for 16-bit multiplications.

To explain more exemplary detail of programmable data path configurations provided in a multiplier block 62 in FIG. 5, FIG. 6 is provided. FIG. 6 is a schematic diagram of internal components of a multiplier block 62 in FIGS. 3 and 4 having programmable data path configurations capable of multiplying 8-bit by 8-bit vector data input sample set 66, and 16-bit by 16-bit vector data input sample set 66. In this regard, the multiplier block 62 includes four 8×8-bit multipliers 84(3)-84(0) in this example. Any desired number of multipliers 84 could be provided. A first multiplier 84(3) is configured to receive 8-bit vector data input sample set 66A[H] (which is the high bits of input multiplicand input 'A') and multiply the vector data input sample set 66A[H] with either 8-bit vector data input sample set 66B[H] (which is the high bits of input multiplicand input 'B') or 8-bit vector data input sample set 66C[I] (which is the high bits of input multiplicand input 'C'). A multiplexor 86(3) is provided that is configured to select either 8-bit vector data input sample set 66B[H] or 8-bit vector data input sample set 66C[I] being providing as a multiplicand to the multiplier 84(3). The multiplexor 86(3) is controlled by multiplicand selector bit input 82[3], which is the high bit in the multiplicand selector input 82 in this embodiment. In this manner, the multiplexor 86(3) and the multiplicand selector bit input 82[3] provide a programmable internal data path 67[0] configuration for the multiplier 84(3) to control whether 8-bit vector data input sample set 66B[H] or 8-bit vector data input sample set 66C[I] is multiplied with receive vector data input sample set 66A[H].

With continuing reference to FIG. 6, the other multipliers 84(2)-84(0) also include similar programmable internal data paths 67[2]-67[0] as provided for the first multiplier 84(3). Multiplier 84(2) includes the programmable internal data path 67[2] having a programmable configuration to provide either 8-bit vector data input sample set 66B[H] or 8-bit vector data input sample set 66C[I] in the programmable internal data path 67[1] to be multiplied with 8-bit vector data input sample set 66A[L], which is the low bits of multiplicand input 'A.' The selection is controlled by multiplexor 86(2) according to the multiplicand selector bit input 82[2] in the multiplicand selector input 82 in this embodiment. Multiplier 84(1) includes programmable internal data path 67[1] programmable to provide either 8-bit vector data input sample set 66B[L], which is the low bits of multiplicand input 'B,' or 8-bit vector data input sample set 66C[Q], which is the low bits of multiplicand input 'C' in the programmable internal data path 67[1] to be multiplied with 8-bit vector data input sample set 66A[H]. The selection is controlled by multiplexor 86(1) according to the multiplicand selector bit input 82[1] in the multiplicand selector input 82 in this embodiment. Further, multiplier 84(0) includes programmable internal data path 67[0] programmable to provide either 8-bit vector data input sample set 66B[L] or 8-bit vector data input sample set 66C[Q] in the programmable internal data path 67[0], to be multiplied with 8-bit vector data input sample set 66A[L]. The selection is controlled by multiplexor 86(0) according to the multiplicand selector bit input 82[0] in the multiplicand selector input 82 in this embodiment.

With continuing reference to FIG. 6, as discussed above, the multipliers 84(3)-84(0) can be configured to perform different bit length multiplication operations. In this regard, each multiplier 84(3)-84(0) includes bit length multiply mode inputs 88(3)-88(0), respectively. In this example, each multiplier 84(3)-84(0) can be programmed in 8-bit by 8-bit mode according to the inputs that control the configuration of programmable data paths 90(3)-90(0), 91, and 92(3)-92(0), respectively. Each multiplier 84(3)-84(0) can also be programmed to provide part of a larger bit multiplication operation, including 16-bit by 16-bit mode and 24-bit by 8-bit mode, according to the inputs that control the configuration of programmable data paths 90(3)-90(0), 91, and 92(3)-92(0), respectively. For example, if each multiplier 84(3)-84(0) is configured in 8-bit by 8-bit multiply mode according to the configuration of the programmable data paths 90(3)-90(0), the plurality of multipliers 84(3)-84(0) as a unit can be configured to comprise two (2) individual 8-bit by 8-bit multipliers as part of the multiplier block 62. If each multiplier 84(3)-84(0) is configured in 16-bit by 16-bit multiply mode according to configuration of the programmable data path 91, the plurality of multipliers 84(3)-84(0) as a unit can be configured to comprise a single 16-bit by 16-bit multiplier as part of the multiplier block 62. If the multipliers 84(3)-84(0) are configured in 24-bit by 8-bit multiply mode according to configuration of the programmable data paths 92(3)-92(0), the plurality of multipliers 84(3)-84(0) as a unit can be configured to comprise one (1) 16-bit by 24-bit by 8-bit multiplier as part of the multiplier block 62.

With continuing reference to FIG. 6, the multipliers 84(3)-84(0) in this example are shown as being configured in 16-bit by 16-bit multiply mode. Sixteen (16)-bit input sums 94(3), 94(2) and input carries 96(3), 96(2) are generated by each multiplier 84(3), 84(2), respectively. Sixteen (16)-bit input sums 94(1), 94(0) and input carries 96(1), 96(0) are generated by each multiplier 84(1), 84(0), respectively. The 16-bit input sums 94(3), 94(2) and input carries 96(3), 96(2) are also provided to a 24-bit 4:2 compressor 109 along with 16-bit sums input 94(1), 94(0) and input carries 96(1), 96(0) to add the input sums 94(3)-94(0) and input carries 96(3)-96(0) together. The added input sums 94(3)-94(0) and input carries 96(3)-96(0) provide a single sum 98 and single carry 100 in 16-bit by 16-bit multiply mode when the programmable data path 91 is active and gated with the input sums 94(3)-94(0) and input carries 96(3)-96(0). The programmable data path 91 is gated by a first AND-based gate 102(3) with combined input sums 94(3), 94(2) as a 16-bit word, and by a second AND-based gate 102(2) with combined input carries 96(3), 96(2) as a 16-bit word to be provided to the 24-bit 4:2 compressor 109. The programmable data path 91 is also gated by a third AND-based gate 102(1) with combined input sums 94(1), 94(0) as a 16-bit word, and by a fourth AND-based gate 102(0) with combined input carries 96(1), 96(0) as a 16-bit word to be provided to the 24-bit 4:2 compressor 109. The programmable output data path 70[0] is provided with the vector multiply output sample set 68[0] as a compressed 32-bit sum S0 and 32-bit carry C0 partial product if the multiplier block 62 is configured in a 16-bit by 16-bit or 24-bit by 8-bit multiply mode.

The programmable output data path 70[1] configuration is provided as the 16-bit input sums 94(3)-94(0) and corresponding 16-bit input carries 96(3)-96(0) as partial products without compression, if the multipliers 84(3)-84(0) in the multiplier block 62 are configured in 8-bit by 8-bit multiply mode. The programmable output data path 70[1] is provided as the 16-bit input sums 94(3)-94(0) and corresponding 16-bit input carries 96(3)-96(0) as the vector multiply output sample sets 68[1] without compression if the multipliers 84(3)-84(0) in the multiplier block 62 are configured in 8-bit by 8-bit multiply mode. The vector multiply output sample sets 68[0], 68[1], depending on a multiplication mode of the multiplier block 62, are provided to the accumulator blocks 72(3)-72(0) for accumulation of sum and carry products according to the vector instruction being executed.

Figure 7:
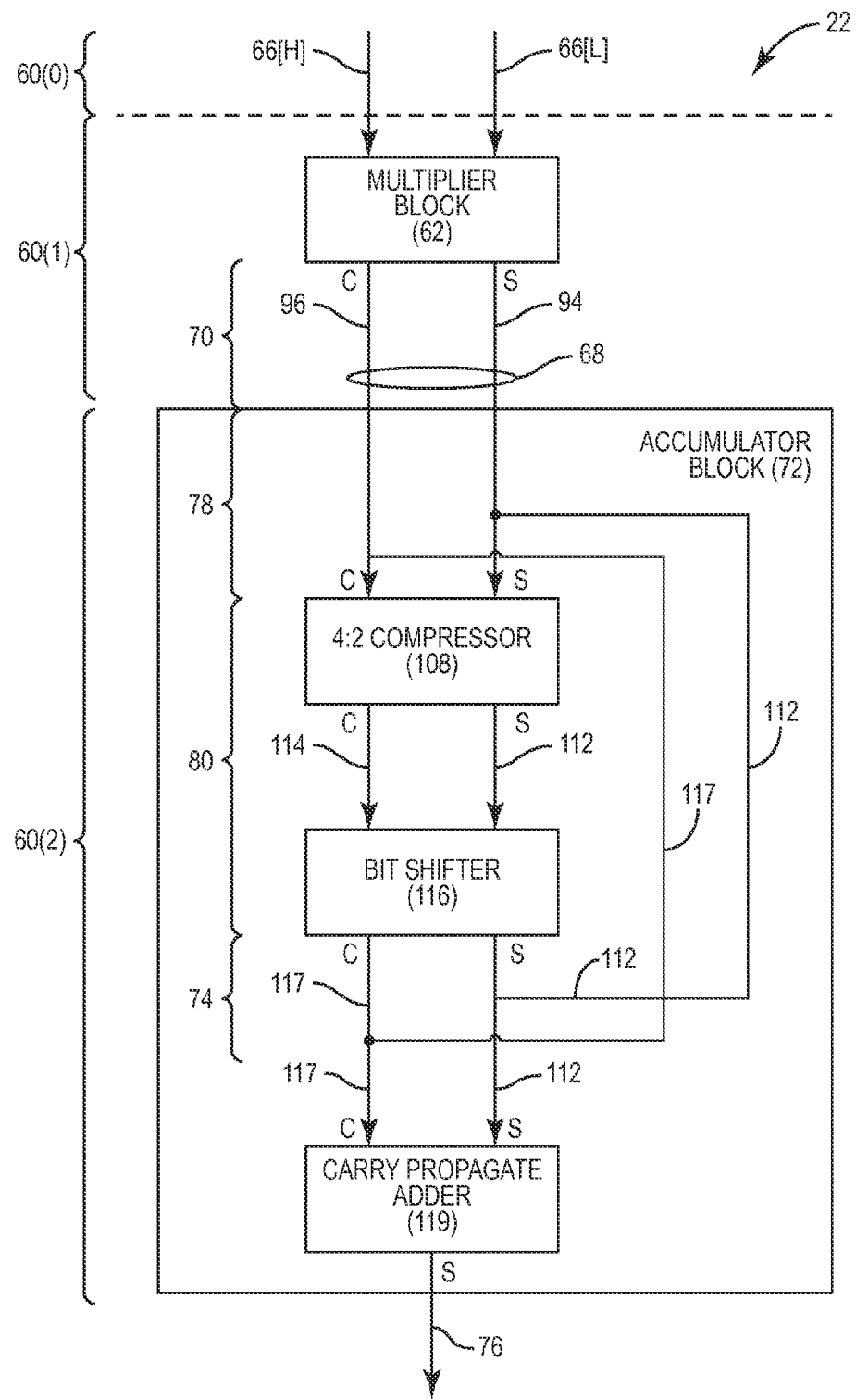
FIG. 7 is a generalized schematic diagram of a multiplier block and accumulator block in the VPE of FIGS. 2 and 3, wherein the accumulator block employs a carry-save accumulator structure employing redundant carry-save format to reduce carry propagation.

Now that the multiplier blocks 62(3)-62(0) in FIGS. 4 and 5 having programmable data path configurations have been described, features of the multiplier blocks 62(3)-62(0) in the VPE 22 to be fused with the accumulator blocks 72(3)-72(0) configured in redundant carry-save format will now described in general with regard to FIG. 7.

In this regard, FIG. 7 is a generalized schematic diagram of a multiplier block and accumulator block in the VPE of FIGS. 2 and 3, wherein the accumulator block employs a carry-save accumulator structure employing redundant carry-save format to reduce carry propagation. As previously discussed and illustrated in FIG. 7, the multiplier blocks 62 are configured to multiply multiplicand inputs 66[H] and 66[L] and provide at least one input sum 94 and at least one input carry 96 as a vector multiply output sample sets 68 in the programmable output data path 70. To eliminate the need to provide a carry propagation path and a carry propagation adder in the accumulator block 72 for each accumulation step, the at least one input sum 94 and the at least one input carry 96 in the vector multiply output sample sets 68 in the programmable output data path 70 are fused in redundant carry-save format to at least one accumulator block 72. In other words, the carry 96 in the vector multiply output sample sets 68 is provided as vector input carry 96 in carry-save format to the accumulator block 72. In this manner, the input sum 94 and the input carry 96 in the vector multiply output sample sets 68 can be provided to a compressor 108 of the accumulator block 72, which in this embodiment is a complex gate 4:2 compressor. The compressor 108 is configured to accumulate the input sum 94 and the input carry 96 together with a previous accumulated vector output sum 112 and a previous shifted accumulated vector output carry 117, respectively. The previous shifted accumulated vector output carry 117 is in essence the saved carry accumulation during the accumulation operation.

In this manner, only a single, final carry propagate adder is not required to be provided in the accumulator block 72 to propagate the received input carry 96 to the input sum 94 as part of the accumulation generated by the accumulator block 72. Power consumption associated with performing a carry propagation add operation during each step of accumulation in the accumulator block 72 is reduced in this embodiment. Also, gate delay associated with performing a carry propagation add operation during each step of accumulation in the accumulator block 72 is also eliminated in this embodiment.

With continuing reference to FIG. 7, the compressor 108 is configured to accumulate the input sum 94 and the input carry 96 in a redundant form with the previous accumulated vector output sum 112 and previous shifted accumulated vector output carry 117, respectively. The shifted accumulated vector output carry 117 is generated by an accumulated vector output carry 114 generated by the compressor 108 bit by shifting the accumulated vector output carry 114 before the next accumulation of the next received input sum 94 and input carry 96 is performed by the compressor 108. The final shifted accumulated vector output carry 117 is added to the final accumulated vector output sum 112 by a single, final carry propagate adder 119 provided in the accumulator block 72 propagate the carry accumulation in the final shifted accumulated vector output carry 117 to convert the final accumulated vector output sum 112 to the final accumulator output sample set 76 2's complement notation. The final accumulated vector output sum 112 is provided as accumulator output sample set 76 in the programmable output data path 74 (see FIG. 3).

Figure 8:
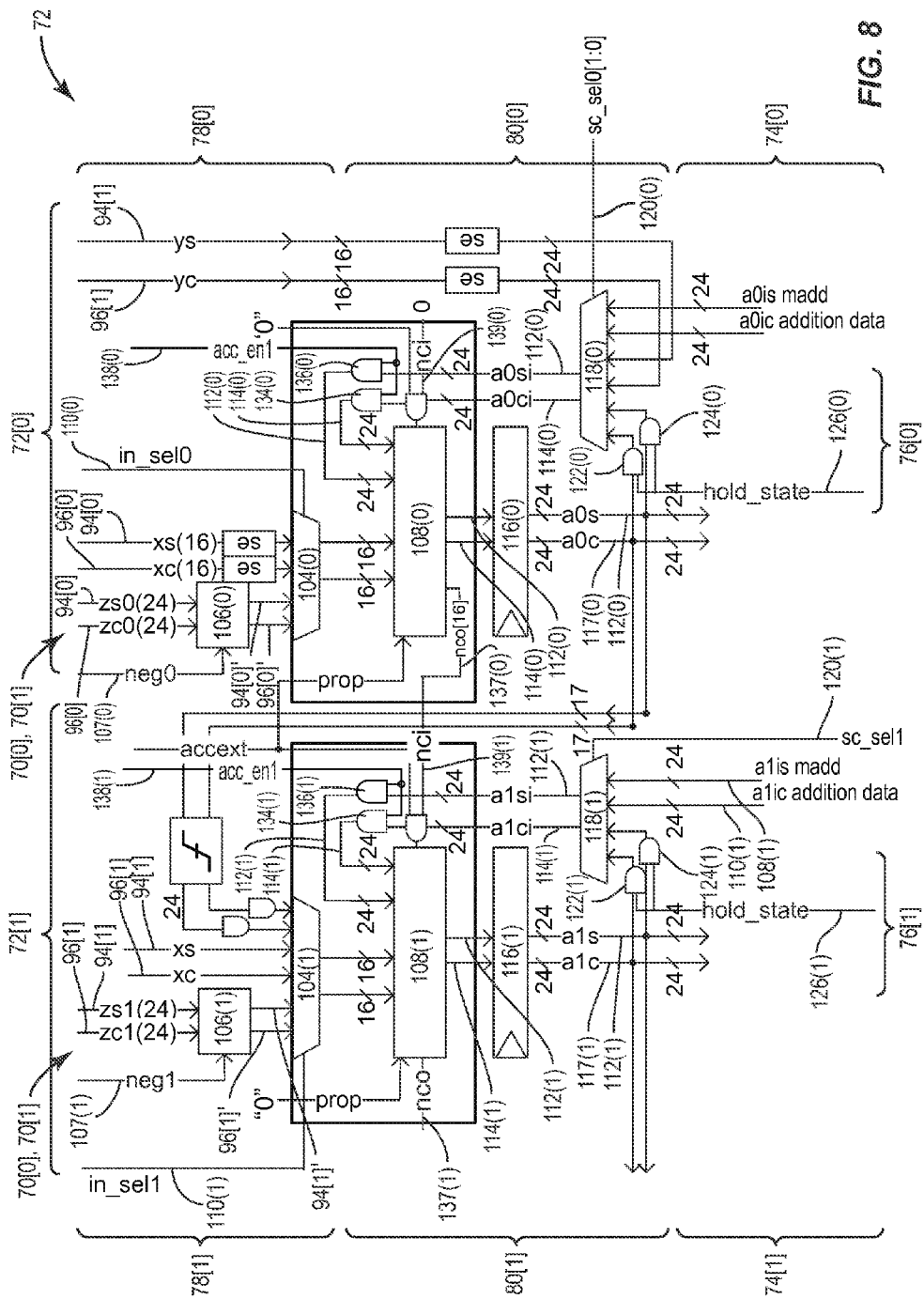
FIG. 8 is a detailed schematic diagram of exemplary internal components of the accumulator block of FIG. 7, which is provided in the VPE of FIGS. 2 and 3, wherein the accumulator block has programmable data path configurations, so that the accumulator block can be programmed in multiple modes to perform specific, different types of vector accumulate operations with redundant carry-save format.

Now that FIG. 7 illustrating the fusing of a multiplier blocks 62 with an accumulator block 72 configured in redundant carry-save format has been described, more exemplary detail regarding the accumulator blocks 72(3)-72(0) are now described in general with regard to FIG. 8. FIGS. 9A-9C described below provide more exemplary detail of the accumulator blocks 72(3)-72(0) configured in redundant carry-save format in different accumulation modes to provide different vector accumulation operations with common circuitry and hardware.

FIG. 8 is a detailed schematic diagram of exemplary internal components of an accumulator block 72 provided in the VPE 22 of FIG. 3. As previously discussed and discussed in more detail below, the accumulator block 72 is configured with programmable input data paths 78(3)-78(0) and/or the programmable internal data paths 80(3)-80(0), so that the accumulator block 72 can be programmed to act as dedicated circuitry designed to perform specific, different types of vector accumulation operations. For example, the accumulator block 72 can be programmed to provide a number of different accumulations and additions, including signed and unsigned accumulate operations. Specific examples of the programmable input data paths 78(3)-78(0) and/or programmable internal data paths 80(3)-80(0) in the accumulator block 72 being configured to provide different types of accumulation operations are illustrated in FIGS. 9A-9C discussed below. Also, the accumulator block 72 is configured to include carry-save accumulators 72[0], 72[1] to provide redundant carry arithmetic to avoid or reduce carry propagation to provide high speed accumulation operations with reduced combinational logic.

Exemplary internal components of the accumulator block 72 are shown in FIG. 8. As illustrated therein, the accumulator block 72 in this embodiment is configured to receive a first input sum 94[0] and first input carry 96[0], and a second input sum 94[1] and second input carry 96[1] from a multiplier block 62 to be accumulated together. With regard to FIG. 8, the input sums 94[0], 94[1] and input carries 96[0], 96[1] will be referred to as vector input sums 94[0], 94[1] and vector input carries 96[0], 96[1]. As previously described and illustrated in FIG. 6, the vector input sums 94[0], 94[1] and vector input carries 96[0], 96[1] in this embodiment are each 16-bits in length. The accumulator block 72 in this example is provided as two 24-bit carry-save accumulators 72[0], 72[1], each containing similar components with common element numbers with '[0]' being designated for carry-save accumulator 72[0], and with '[1]' being designated for carry-save accumulator 72[1]. The carry-save accumulators 72[0], 72[1] can be configured to perform vector accumulation operations concurrently.

With reference to carry-save accumulator 72[0] in FIG. 8, the vector input sum 94[0] and vector input carry 96[0] are input in a multiplexor 104(0) provided as part of the programmable internal data path 80[0]. A negation circuit 106(0), which may be comprised of exclusive OR-based gates, is also provided that generates a negative vector input sum 94[0]' and negative vector input carry 96[0]' according to an input 107(0), as inputs into the multiplexor 104(0) for accumulation operations requiring a negative vector input sum 94[0]' and negative vector input carry 96[0]'. The multiplexor 104(0) is configured to select either vector input sum 94[0] and vector input carry 96[0] or the negative vector input sum 94[0]' and the negative vector input carry 96[0]' to be provided to a compressor 108(0) according to a selector input 110(0) generated as a result of the vector instruction decoding. In this regard, the selector input 110(0) allows the programmable input data path 78[0] of carry-save accumulator 72[0] to be programmable to provide either the vector input sum 94[0] and vector input carry 96[0], or the negative vector input sum 94[0]' and the negative vector input carry 96[0]', to the compressor 108(0) according to the accumulation operation configured to be performed by the accumulator block 72.

With continuing reference to FIG. 8, the compressor 108(0) of the carry-save accumulator 72[0] in this embodiment is a complex gate 4:2 compressor. In this regard, the compressor 108(0) is configured to accumulate sums and carries in redundant carry-save operations. The compressor 108(0) is configured to accumulate a current vector input sum 94[0] and vector input carry 96[0], or a current negative vector input sum 94[0]' and negative vector input carry 96[0]', together with previous accumulated vector input sum 94[0] and vector input carry 96[0], or accumulated negative vector input sum 94[0]' and negative vector input carry 96[0]', as the four (4) inputs to the compressor 108(0). The compressor 108(0) provides an accumulated vector output sum 112(0) and accumulated vector output carry 114(0) as the accumulator output sample set 76[0] in the programmable output data path 74[0] (see FIG. 3) to provide accumulator output sample sets 76(3)-76(0). The accumulated vector output carry 114(0) is shifted by a bit shifter 116(0) during accumulation operations to provide a shifted accumulated vector output carry 117(0) to control bit width growth during each accumulation step. For example, the bit shifter 116(0) in this embodiment is a barrel-shifter that is fused to the compressor 108(0) in redundant carry-save format. In this manner, the shifted accumulated vector output carry 117(0) is in essence saved without having to be propagated to the accumulated vector output sum 112(0) during the accumulation operation performed by the accumulator 72[0]. In this manner, power consumption and gate delay associated with performing a carry propagation add operation during each step of accumulation in the accumulator 72[0] is eliminated in this embodiment.

Additional follow-on vector input sums 94[0] and vector input carries 96[0], or negative vector input sums 94[0]' and negative vector input carries 96[0]', can be accumulated with the current accumulated vector output sum 112(0) and current accumulated vector output carry 117(0). The vector input sums 94[0] and vector input carries 96[0], or negative vector input sums 94[0]' and negative vector input carries 96[0]', are selected by a multiplexor 118(0) as part of the programmable internal data path 80[0] according to a sum-carry selector 120(0) generated as a result of the vector instruction decoding. The current accumulated vector output sum 112(0) and current shifted accumulated vector output carry 117(0) can be provided as inputs to the compressor 108(0) for carry-save accumulator 72[0] to provide an updated accumulated vector output sum 112(0) and accumulated vector output carry 114(0). In this regard, the sum-carry selector 120(0) allows the programmable internal data path 80[0] of accumulator 72[0] to be programmable to provide the vector input sum 94[0] and vector input carry 96[0] to the compressor 108(0) according to the accumulation operation configured to be performed by the accumulator block 72. Hold gates 122(0), 124(0) are also provided in this embodiment to cause the multiplexor 118(0) to hold the current state of the accumulated vector output sum 112(0) and shifted accumulated vector output carry 117(0) according to a hold state input 126(0) to control operational timing of the accumulation in the carry-save accumulator 72[0].

With continuing reference to FIG. 8, the accumulated vector output sum 112(0) and shifted accumulated vector output carry 117(0) of carry-save accumulator 72[0], and the accumulated vector output sum 112(1) and shifted accumulated vector output carry 117(1) of carry-save accumulator 72[1], and are gated by control gates 134(0), 136(0) and 134(1), 136(1), respectively. The control gates 134(0), 136(0) and 134(1), 136(1) control the accumulated vector output sum 112(0) and shifted accumulated vector output carry 117(0), and the accumulated vector output sum 112(1) and shifted accumulated vector output carry 117(1), respectively, being returned to the compressors 108(0), 108(1).

In summary with the programmable input data paths 78[0], 78[1] and programmable internal data paths 80[0], 80[1] of the accumulators 72[0], 72[1] of the accumulator block 72 in FIG. 8, the accumulator block 72 can be configured in different modes. The accumulator block 72 can be configured to provide different accumulation operations according to a specific vector processing instruction with common accumulator circuitry illustrated in FIG. 8. Examples of the accumulator block 72 being configured to provide different accumulation operations according to a specific vector processing instruction with common accumulator circuitry are illustrated in FIGS. 9A-9C below.

In this regard, FIG. 9A is a schematic diagram of the same accumulator block 72 in FIG. 8. In this example, the accumulator block 72 has programmable input data paths 78[0], 78[1] and programmable internal data paths 80[0], 80[1] programmed to provide a dual 24-bit accumulator mode. Each carry-save accumulator 72[0], 72[1] in the accumulator block 72 in FIG. 9A is configured to provide a 24-bit accumulator. The 24-bit accumulation capacities of the accumulators 72[0], 72[1] are provided by the bit capacity of the compressors 108(0), 108(1). The discussion of the accumulators 72[0], 72[1] with regard to FIG. 8 explains the individual 24-bit accumulations provided by accumulators 72[0], 72[1] in FIG. 9A. The general data path of accumulations performed by the by accumulators 72[0], 72[1] for providing dual 24-bit accumulations in the accumulation block 72 is shown in programmable accumulate data paths 132(0) and 132(1), respectively, in FIG. 9A.

With continuing reference to FIG. 9A, the exemplary components of carry-save accumulator 72[0] will be described, but are equally applicable to carry-save accumulator 72[1]. In this embodiment, the accumulated vector output sum 112(0) and shifted accumulated vector output carry 117(0) of carry-save accumulator 72[0], and the accumulated vector output sum 112(1) and shifted accumulated vector output carry 117(1) of carry-save accumulator 72[1], and are gated by the control gates 134(0), 136(0) and 134(1), 136(1), respectively. The control gates 134(0), 136(0) and 134(1), 136(1) control the accumulated vector output sum 112(0) and shifted accumulated vector output carry 117(0), and the accumulated vector output sum 112(1) and shifted accumulated vector output carry 117(1), respectively, being returned to the compressors 108(0), 108(1). Control inputs 138(0), 138(1) provided from decoding of vector instructions to both control gates 134(0), 136(0) and 134(1), 136(1), respectively, control the accumulated vector output sum 112(0) and shifted accumulated vector output carry 117(0), and the accumulated vector output sum 112(1) and shifted accumulated vector output carry 117(1), respectively, are returned to the compressors 108(0), 108(1). The control inputs 138(0), 138(1) and control gates 134(0), 136(0) control whether the accumulators 72[0], 72[1] are programmed to each perform separate accumulation operations or combined accumulation operations, as will be discussed in more detail below with regard to FIGS. 9B and 9C. Thus, the control inputs 138(0), 138(1) and the control gates 134(0), 136(0) and 134(1), 136(1) form part of the programmable internal data paths 80[0], 80[1] of the accumulators 72[0], 72[1], respectively, in this embodiment.

With reference back to FIG. 8, the programmable internal data paths 80[0], 80[1] of the accumulator block 72 can also be programmed and/or reprogrammed to perform accumulate operations greater than the 24-bit capacity of the individual accumulators 72[0], 72[1]. In this regard, the programmable internal data paths 80[0], 80[1] of the accumulators 72[0], 72[1] can be programmed to provide for both accumulators 72[0], 72[1] to be employed together in a single vector accumulation operation. The accumulators 72[0], 72[1] can be programmed to provide a single accumulation operation of greater bit capacity than the individual bit accumulation capacities of the accumulators 72[0], 72[1]. The programmable internal data paths 80[0], 80[1] of the accumulators 72[0], 72[1] can be configured to allow carry-save accumulator 72[0] to propagate an overflow carry output as a next carry output (NCO) 137(0) from compressor 108(0). The NCO 137(0) can be provided as a next carry input (NCI) 139(1) to compressor 108(1) in carry-save accumulator 72[1]. This carry propagation configuration capability provided as programmable internal data paths 80[0], 80[1] in the accumulators 72[0], 72[1] to allow the accumulators 72[0], 72[0] to provide 24-bit overflow carry propagation to 24-bit carry and sum accumulations, as previously described with regard to FIG. 8, to provide 40-bit accumulation in this embodiment.

In this regard, FIG. 9B is a schematic diagram of the same accumulator block 72 in FIG. 8. In FIG. 9B, the accumulator block 72 is shown configured in a single accumulation operation mode. In FIG. 9B, the accumulators 72[0], 72[1] have programmable internal data paths 80[0], 80[1] configured for providing a single accumulation operation in the accumulator block 72. In this example of a single accumulator mode of accumulator block 72, the accumulators 72[0], 72[1] accumulate a single 40-bit accumulated vector output sum 112 and shifted accumulated vector output carry 117. The single accumulated vector output sum 112 is comprised of the accumulated vector output sums 112(0), 112(1) provided as an accumulator output sample set 76 in programmable output data paths 74[0], 74[1] (see also, FIG. 3). The accumulated vector output sum 112(0) comprises the least significant bits of the single 40-bit accumulated vector output sum 112. The accumulated vector output sum 112(1) comprises the most significant bits of the single 40-bit accumulated vector output sum 112. Similarly, the shifted accumulated vector output carry 117 is comprised of the shifted accumulated output carries 117(0), 117(1). The shifted accumulated vector output carry 117(0) comprises the least significant bits of the single shifted accumulated vector output carry 117. The accumulated vector output sum 114(1) comprises the most significant bits of the single 40-bit accumulated vector output carry 114. The accumulate vector output sum 114[0] and shifted accumulated vector output carry 117(0) are provided in programmable output data path 74[0] (see FIG. 3).

With continuing reference to FIG. 9B, the general data path of accumulation operations performed by accumulators 72[0], 72[1] when the accumulator block 72 is configured in a single accumulation mode (e.g., 40-bit accumulation) is shown as programmable accumulate data path 146. In this regard, the accumulator block 72 receives the vector input sum 94 and vector input carry 96 as previously described. The carry-save accumulator 72[0] accumulates the least significant bits of accumulated vector output sum 112(0) and accumulated vector output carry 114(0) from accumulations of the vector input sums 94[0] and vector input carries 96[0], or negative vector input sums 94[0]' and negative vector input carries 96[0]'s, as the case may be. The carry-save accumulator 72[1] accumulates the most significant bits of the accumulated vector output sum 112(1) and accumulated vector output carry 114(1) from accumulations of the vector input sums 94[0] and vector input carries 96[0], or negative vector input sums 94[0]' and negative vector input carries 96[0]'s, as the case may be.

With continuing reference to FIG. 9B, to program the accumulators 72[0], 72[1] to provide the single accumulated vector output sum 112 and accumulated vector output carry 114, the programmable internal data paths 80[0],80[1] of accumulators 72[0], 72[1] are programmed to provide a single accumulation operation. In this regard, the NCO 137(0) of compressor 108(0) of carry-save accumulator 72[0] and the NCI 139(1) of compressor 108(1) of carry-save accumulator 72[1] are configured for providing a single accumulator (e.g., 40-bit accumulator) in the accumulator block 72. The NCI 139(1) of the carry-save accumulator 72[1] is gated by NCI gate 140(1) with NCI control input 142(1). In this manner, when it is desired for the accumulators 72[0], 72[1] in the accumulator block 72 to provide a single accumulation operation employing overflow carry propagation from carry-save accumulator 72[0] to carry-save accumulator 72[1], the NCI control input 142(1) can be made active as part of the programmable internal data path 80[1] of the carry-save accumulator 72[1]. The NCI control input 142(1) causes the NCI gate 140(1) to allow an overflow carry propagation from the compressor 108(0) to compressor 108(1). The NCI control input 142(1) is also coupled to a carry propagate input 144(0) of the compressor 108(0) in carry-save accumulator 72[0] to cause the compressor 108(0) to generate the NCO 137(0) as NCI 139(1) to compressor 108(1). These configurations allow the carry-save accumulator 72[1] to accumulate vector input sums 94[1] and vector input carries 96[1] in a manner that can provide a single accumulated vector output sum 112 and accumulated vector output carry 114.

Note that carry-save accumulator 72[1] in the accumulator block 72 also includes a NCI gate 140(0) gated by NCI 139(0) and NCI control input 142(0), as shown in FIG. 9B. However, both NCI control input 142(0) and NCI 139(0) are tied to logical '0' in this embodiment since carry-save accumulator 72[0] accumulates the least significant bits of the single accumulation operation. Also note that compressor 108(0) of carry-save accumulator 72[1] also includes a carry propagate input 144(1), but the carry propagate input 144(1) is tied to logical '0' in this embodiment to cause the accumulator 72(1) to not generate the NCO 12(1). The carry-save accumulator 72[1] does not need to perform carry propagation to a next accumulator in this embodiment, since there is not another accumulator beyond carry-save accumulator 72[1] provided in this embodiment of the accumulator block 72.

FIG. 9C is a schematic diagram of another accumulator mode of the same accumulator block 72 in FIG. 8. In this regard, FIG. 9C is a schematic diagram of the accumulator block 72 in FIG. 8 having programmed data path configurations to provide a carry-save adder followed by a single accumulator to provide another accumulation mode in the accumulator block 72. Some accumulation operations may require an extra adder to perform complex arithmetic. In FIG. 9C, the accumulators 72[0], 72[1] have programmable internal data paths 80[0], 80[1] configured for providing a 16-bit carry-save adder followed by a single 24-bit accumulator.

With reference to FIG. 9C, the general data path of accumulations performed by accumulators 72[0], 72[1] when the accumulator block 72 is configured in carry-save adder followed by a single accumulator is shown by programmable data path 148. In this regard, the sum-carry selector 120(0) is generated as a result of the vector instruction decoding to cause the multiplexor 118(0) to provide the vector input sum 94[1] and vector input carry 96[0] to the control gates 134(0), 136(0). The control input 138(0) is made active to program the programmable internal data path 80[1] of carry-save accumulator 72[0] to cause the control gates 134(0), 136(0) to provide the vector input sum 94[1] and vector input carry 96[1] to the compressor 108(0). The vector input sum 94[1] and vector input carry 96[1] are accumulated with the vector input sum 94[0] and vector input carry 96[1] by the compressor 108(0) of the carry-save accumulator 72[0] to provide the accumulated vector output sum 112(0) and accumulated vector output carry 114(0). The accumulated vector output sum 112(0) and shifted accumulated vector output carry 117(0) are provided as the accumulator output sample set 76[0] in programmable output data path 74[0] (see also, FIG. 3) to provide a carry-save adder. The shifted accumulated vector output carry 117(0) is also provided to carry-save accumulator 72[1] as shown in programmable data path 148 to be provided by multiplexor 104(1) to compressor 108(1) to be accumulated to vector input sum 94[1] and vector input carry 96[1] to provide accumulated vector output sum 112(1) and shifted accumulated vector output carry 117(1) as accumulator output sample set 76[1] in programmable output data path 74[1] (see also, FIG. 3) as a 24-bit accumulator.

VPEs having programmable data path configurations for vector processing, and according to concepts and embodiments discussed herein, including but not limited to the VPE 22 in FIGS. 2 and 3, may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 10:
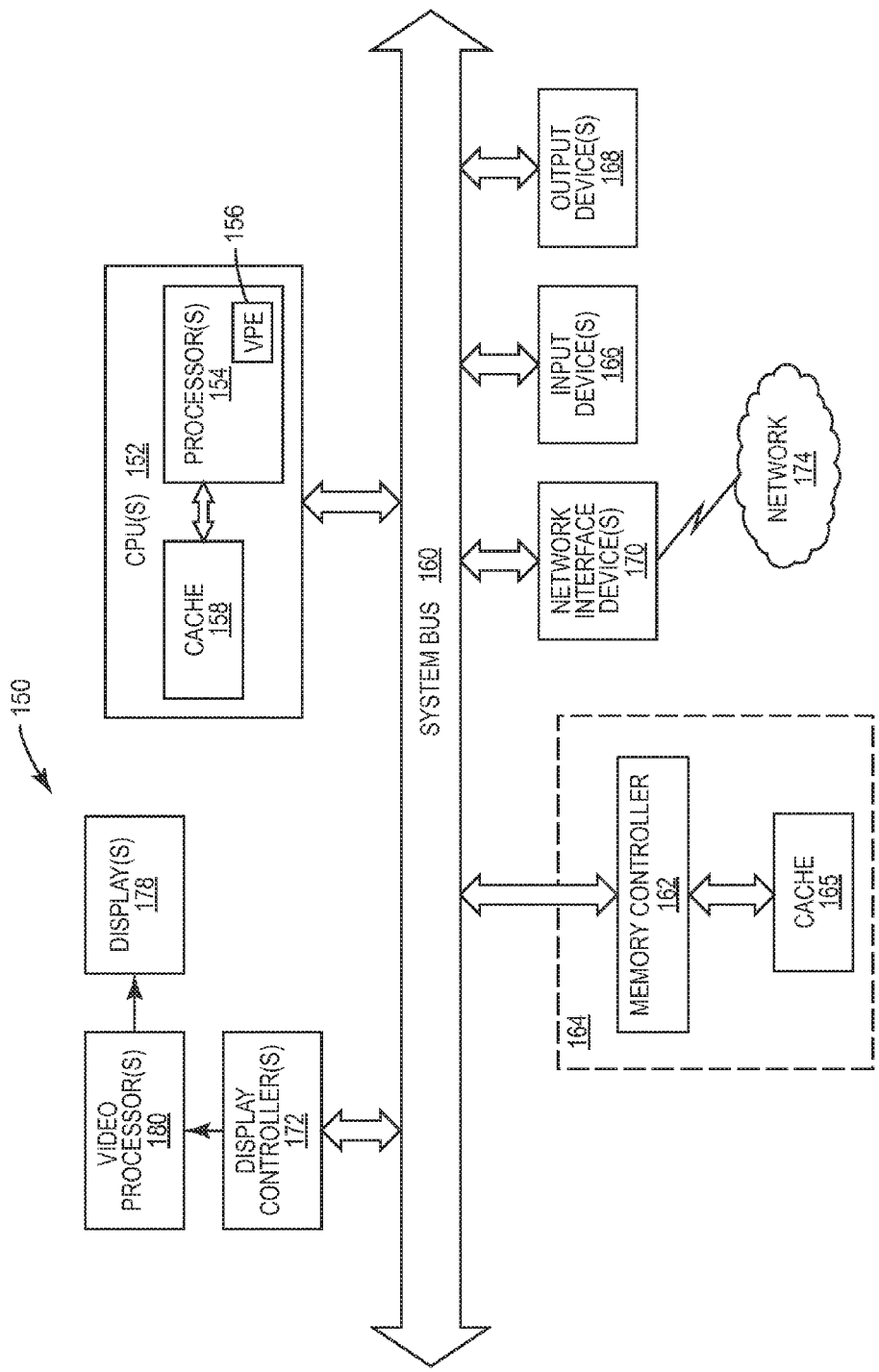
FIG. 10 is a block diagram of an exemplary processor-based system that can include a vector processor that includes a VPE having programmable data path configurations, so common circuitry and hardware in the VPE can be programmed to act as dedicated circuitry designed to perform specific types of vector operations in a highly efficient manner for multiple applications or technologies, without a requirement to provide separate VPEs, according to the embodiments disclosed herein.

In this regard, FIG. 10 illustrates an example of a processor-based system 150. In this example, the processor-based system 150 includes one or more processing units (PUs) 152, each including one or more processors or cores 154. The PU 152 may be the baseband processor 20 in FIG. 2 as a non-limiting example. The processor 154 may be a vector processor like the baseband processor 20 provided in FIG. 2 as a non-limiting example. In this regard, the processor 154 may also include a VPE 156, including but not limited to the VPE 22 in FIG. 2. The PU(s) 152 may have cache memory 158 coupled to the processor(s) 154 for rapid access to temporarily stored data. The PU(s) 152 is coupled to a system bus 160 and can intercouple master and slave devices included in the processor-based system 150. As is well known, the PU(s) 152 communicates with these other devices by exchanging address, control, and data information over the system bus 160. For example, the PU(s) 152 can communicate bus transaction requests to a memory controller 162 as an example of a slave device. Although not illustrated in FIG. 10, multiple system buses 160 could be provided, wherein each system bus 160 constitutes a different fabric.

Other master and slave devices can be connected to the system bus 160. As illustrated in FIG. 10, these devices can include a memory system 164, one or more input devices 166, one or more output devices 168, one or more network interface devices 170, and one or more display controllers 172, as examples. The memory system 164 can include memory 165 accessible by the memory controller 162. The input device(s) 166 can include any type of input device, including but not limited to input keys, switches, voice processors, etc. The output device(s) 168 can include any type of output device, including but not limited to audio, video, other visual indicators, etc. The network interface device(s) 170 can be any devices configured to allow exchange of data to and from a network 174. The network 174 can be any type of network, including but not limited to a wired or wireless network, a private or public network, a local area network (LAN), a wide local area network (WLAN), and the Internet. The network interface device(s) 170 can be configured to support any type of communication protocol desired.

The CPUs 152 may also be configured to access the display controller(s) 172 over the system bus 160 to control information sent to one or more displays 178. The display controller(s) 172 sends information to the display(s) 178 to be displayed via one or more video processors 180, which process the information to be displayed into a format suitable for the display(s) 178. The display(s) 178 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the embodiments of dual voltage domain memory buffers disclosed herein may be implemented as electronic hardware, instructions stored in memory or in another computer-readable medium and executed by a processor or other processing device, or combinations of both. The arbiters, master devices, and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a processor, a DSP, an Application Specific Integrated Circuit (ASIC), an FPGA or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A vector processing engine (VPE) configured to provide multi-mode vector processing of vector data, comprising:
    an input read stage configured to provide a plurality of vector data input sample sets in a plurality of input data paths;
    at least one vector processing stage comprising a plurality of vector processing blocks, each vector processing block among the plurality of vector processing blocks configured to:
        receive at least two vector data input sample sets from the plurality of vector data input sample sets from at least two input data paths among the plurality of input data paths;
        process the at least two vector data input sample sets to provide at least one vector result output sample set based on a programmable data path configuration for the vector processing block according to a vector instruction executed by the at least one vector processing stage, wherein the vector processing block comprises a plurality of multipliers, the processing by the vector processing block comprises performing a first multiplication operation on the at least two vector data input sample sets using the plurality of multipliers in a first configuration, the programmable data path configuration is configured to be reconfigured to reconfigure the plurality of multipliers into a second configuration to perform a second multiplication operation, and the first multiplication operation and the second multiplication operation are different bit length multiplication operations; and
        provide the at least one vector result output sample set in at least one output data path among a plurality of output data paths; and
    an output processing stage configured to receive the at least one vector result output sample set from each of the plurality of vector processing blocks.

2. The VPE of claim 1, wherein the programmable data path configuration for each of the plurality of vector processing blocks is configured to be reconfigured for each vector instruction executed by the at least one vector processing stage.

3. The VPE of claim 1, wherein the programmable data path configuration for each of the plurality of vector processing blocks is configured to be reconfigured on each clock cycle of the vector instruction executed by the at least one vector processing stage.

4. The VPE of claim 1, wherein:
the programmable data path configuration for each of the plurality of vector processing blocks is comprised of a programmable input data path configuration; and
each of the plurality of vector processing blocks is configured to receive the at least two vector data input sample sets from the at least two input data paths among the plurality of input data paths based on the programmable input data path configuration according to the vector instruction executed by the at least one vector processing stage.

5. The VPE of claim 4, wherein:
the programmable data path configuration for each of the plurality of vector processing blocks is further comprised of a programmable output data path configuration for the at least one vector processing block; and
each of the plurality of vector processing blocks is configured to provide the at least one vector result output sample set in the at least one output data path among the plurality of output data paths based on the programmable output data path configuration according to the vector instruction executed by the at least one vector processing stage.

6. The VPE of claim 5, wherein:
the programmable data path configuration for each of the plurality of vector processing blocks is further comprised of a programmable vector processing block data path configuration for the at least one vector processing block; and
each of the plurality of vector processing blocks is configured to process the at least two vector data input sample sets to provide the at least one vector result output sample set based on the programmable vector processing block data path configuration according to the vector instruction executed by the at least one vector processing stage.

7. The VPE of claim 1, wherein:
the programmable data path configuration for each of the plurality of vector processing blocks is comprised of a programmable output data path configuration for the at least one vector processing block; and
each of the plurality of vector processing blocks is configured to provide the at least one vector result output sample set in the at least one output data path among the plurality of output data paths based on the programmable output data path configuration according to the vector instruction executed by the at least one vector processing stage.

8. The VPE of claim 1, wherein:
the programmable data path configuration for each of the plurality of vector processing blocks is comprised of a programmable vector processing block data path configuration for the at least one vector processing block; and
each of the plurality of vector processing blocks is configured to process the at least two vector data input sample sets to provide the at least one vector result output sample set based on the programmable vector processing block data path configuration according to the vector instruction executed by the at least one vector processing stage.

9. The VPE of claim 1, wherein the at least one vector processing block is comprised of at least one of: at least one multiplier block and at least one accumulator block.

10. The VPE of claim 1, wherein the at least one vector processing stage is comprised of a plurality of vector processing stages.

11. The VPE of claim 1, wherein the at least one vector processing stage is comprised of at least one multiply vector processing stage comprised of a plurality of multiplier blocks and at least one accumulation vector processing stage comprised of a plurality of accumulator blocks;
each multiplier block among the plurality of multiplier blocks configured to:
receive a first vector data input sample set and a second vector data input sample set from the plurality of vector data input sample sets from a first input data path and a second input data path among the plurality of input data paths;
multiply the first vector data input sample set to the second vector data input sample set to provide a vector multiply output sample set in a multiply output data path among a plurality of multiply output data paths based on a programmable multiply data path configuration for the multiplier block according to a vector instruction executed by the at least one first vector processing stage; and
each accumulator block among the plurality of accumulator blocks configured to:
receive a first multiply output sample set and a second multiply output sample set from a first multiply output data path and a second multiply output data path, respectively, among a plurality of multiply output data paths;
accumulate the first multiply output sample set with the second multiply output sample set to provide a vector accumulated result sample set based on a programmable data path configuration for the accumulator block according to a vector instruction executed by the at least one second vector processing stage; and
provide the vector accumulated result sample set in the output data path among the plurality of multiple output data paths.

12. The VPE of claim 1, wherein the at least one vector processing block is not configured to store the least one vector result output sample set in a vector register.

13. The VPE of claim 1, wherein each vector processing block is further configured to process different bit widths of the plurality of vector data input sample sets based on the programmable data path configuration for the vector processing block according to the vector instruction executed by the at least one vector processing stage.

14. The VPE of claim 1, wherein each vector processing block is further configured to process a signed at least one vector data input sample set or an unsigned at least one vector data input sample set based on the programmable data path configuration for the vector processing block according to the vector instruction executed by the at least one vector processing stage.

15. The VPE of claim 1, wherein the at least one vector processing stage is configured to execute the vector instruction comprised of a signed operation instruction.

16. The VPE of claim 1, wherein the at least one vector processing stage is configured to execute the vector instruction comprised of an unsigned operation instruction.

17. A vector processing engine (VPE) configured to provide multi-mode vector processing of vector data, comprising:
an input read stage means configured to provide a plurality of vector data input sample sets in a plurality of input data paths;

at least one vector processing stage means comprising a plurality of vector processing means, each vector processing means among the plurality of vector processing means configured to:
  receive at least two vector data input sample sets from the plurality of vector data input sample sets from at least two input data paths among the plurality of input data paths;
  process the at least two vector data input sample sets to provide at least one vector result output sample set based on a programmable data path configuration for the vector processing means according to a vector instruction executed by the at least one vector processing stage means, wherein the vector processing means comprises a plurality of multipliers, the processing by the vector processing means comprises performing a first multiplication operation on the at least two vector data input sample sets using the plurality of multipliers in a first configuration, the programmable data path configuration is configured to be reconfigured to reconfigure the plurality of multipliers into a second configuration to perform a second multiplication operation, and the first multiplication operation and the second multiplication operation are different bit length multiplication operations; and
  provide the at least one vector result output sample set in at least one output data path among a plurality of output data paths; and
an output processing means configured to receive the at least one vector result output sample set from each of the plurality of vector processing means.

18. A method of processing vector data in a vector processing engine (VPE), comprising:
  providing a plurality of vector data input sample sets in a plurality of input data paths in an input processing stage;
  processing the plurality of vector data input sample sets in a plurality of vector processing blocks in at least one vector processing stage, comprising, in each of the plurality of vector processing blocks:
    receiving at least two vector data input sample sets from the plurality of vector data input sample sets from at least two input data paths among the plurality of input data paths;
    processing the at least two vector data input sample sets to provide at least one vector result output sample set based on a programmable data path configuration for the vector processing block according to a vector instruction executed by the at least one vector processing stage, wherein the vector processing block comprises a plurality of multipliers, and processing the at least two vector data input sample sets comprises performing a first multiplication operation on the at least two vector data input sample sets using the plurality of multipliers in a first configuration; and
    providing the at least one vector result output sample set in a at least one output data path among a plurality of output data paths;
  receiving the at least one vector result output sample set from each of the plurality of vector processing blocks in an output processing stage; and
  reconfiguring the programmable data path configuration for each of the plurality of processing blocks to reconfigure the plurality of multipliers of the vector processing block into a second configuration to perform a second multiplication operation, wherein the first multiplication operation and the second multiplication operation are different bit length multiplication operations.

19. The method of claim 18, comprising:
  receiving the at least two vector data input sample sets from the plurality of vector data input sample sets from the at least two input data paths among the plurality of input data paths based on the programmable input data path configuration according to the vector instruction executed by the at least one vector processing stage; and
  processing the at least one vector data input sample set to provide the at least one vector result output sample set based on the programmable input data path configuration for the vector processing block according to the vector instruction executed by the at least one vector processing stage.

20. The method of claim 18, comprising receiving the at least one vector result output sample set in the at least one output data path among the plurality of output data paths based on a programmable output data path configuration according to the vector instruction executed by the at least one vector processing stage.

21. The method of claim 18, comprising processing the at least two vector data input sample sets to provide the at least one vector result output sample set based on a programmable vector processing block data path configuration for the vector processing block according to the vector instruction executed by the at least one vector processing stage.

22. The method of claim 18, further comprising not storing the least one vector result output sample set in a vector register.

23. The method claim 18, wherein processing the at least two vector data input sample sets comprises processing different bit widths of the plurality of vector data input sample sets based on the programmable data path configuration for the vector processing block according to the vector instruction executed by the at least one vector processing stage.

24. The method of claim 18, wherein processing the at least two vector data input sample sets comprises processing a signed at least one vector data input sample set or an unsigned at least one vector data input sample set based on the programmable data path configuration for the vector processing block according to the vector instruction executed by the at least one vector processing stage.

25. The method of claim 18, wherein processing the at least two vector data input sample sets in each of the vector processing blocks further comprises:
  adding a multiply sample set provided by the first multiplication operation performed on the at least two data input sample sets to a previously provided multiply sample set.

26. The VPE of claim 1, wherein the programmable data path configuration for each of the plurality of vector processing blocks is programmable to configure the plurality of multipliers to form two 8-bit by 8-bit multipliers or a 16-bit by 16-bit multiplier according to the vector instruction executed by the at least one vector processing stage.

27. The VPE of claim 1, wherein the programmable data path configuration for each of the plurality of vector processing blocks is programmable to configure the plurality of multipliers to form a 16-bit by 16-bit multiplier or a 24-bit by 8-bit multiplier according to the vector instruction executed by the at least one vector processing stage.

28. The VPE of claim 1, wherein each of the plurality of vector processing block receives at least four vector data input sample sets from the plurality of vector data input sample sets from at least four of the input data paths among the plurality of input data paths, the plurality of multipliers of each of the plurality of vector processing blocks comprises first and second multipliers, and the programmable data path configuration for each of the plurality of vector processing blocks is configured to:
- input a first one of the at least four vector input sample sets to a first input of the first multiplier;
- input a second one of the at least four vector data input sample sets or a third one of the at least four vector data input sample sets to a second input of the first multiplier according to the vector instruction executed by the at least one vector processing stage;
- input a fourth one of the at least four vector input sample sets to a first input of the second multiplier; and
- input the second one of the at least four vector data input sample sets or the third one of the at least four vector data input samples sets to a second input of the second multiplier according to the vector instruction executed by the at least one vector processing stage.

* * * * *